(12) United States Patent
Walker, Jr. et al.

(10) Patent No.: US 11,413,846 B2
(45) Date of Patent: Aug. 16, 2022

(54) ARTICLE FEATURING A PREDETERMINED PATTERN OF RANDOMLY DISTRIBUTED MICROSPHERES AND METHODS OF MAKING THE SAME

(71) Applicant: 3M INNOVATIVE PROPERTIES COMPANY, St. Paul, MN (US)

(72) Inventors: Christopher B. Walker, Jr., St. Paul, MN (US); Toheeb B. Alabi, Woodbury, MN (US); Kui Chen-Ho, Woodbury, MN (US); John C. Clark, Maplewood, MN (US); Jeremy P. Gundale, Woodbury, MN (US); Vivek Krishnan, St. Paul, MN (US); Alexander J. Kugel, Woodbury, MN (US); Mikhail L. Pekurovsky, Bloomington, MN (US); Chris A. Pommer, Woodbury, MN (US); Matthew S. Stay, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 802 days.

(21) Appl. No.: 16/089,418

(22) PCT Filed: Mar. 29, 2017

(86) PCT No.: PCT/US2017/024711
§ 371 (c)(1),
(2) Date: Sep. 28, 2018

(87) PCT Pub. No.: WO2017/172888
PCT Pub. Date: Oct. 5, 2017

(65) Prior Publication Data
US 2020/0298526 A1    Sep. 24, 2020

Related U.S. Application Data

(60) Provisional application No. 62/319,174, filed on Apr. 6, 2016, provisional application No. 62/315,285, filed on Mar. 30, 2016.

(51) Int. Cl.
*B32B 5/16* (2006.01)
*B32B 7/027* (2019.01)
(Continued)

(52) U.S. Cl.
CPC .................. *B32B 5/16* (2013.01); *B32B 3/02* (2013.01); *B32B 7/027* (2019.01); *B32B 7/06* (2013.01);
(Continued)

(58) Field of Classification Search
CPC ..... Y10T 428/24355; Y10T 428/24372; Y10T 428/2438; Y10T 428/24388;
(Continued)

(56) References Cited

U.S. PATENT DOCUMENTS

| 1,175,224 A | 3/1916 | Bleecker |
| 2,461,011 A | 2/1949 | Taylor |

(Continued)

FOREIGN PATENT DOCUMENTS

| CN | 2363337 | 9/2000 |
| CN | 101314684 | 12/2008 |

(Continued)

OTHER PUBLICATIONS

Chopra, Thin Film Phenomena, McGraw-Hill, 1969, 13 pages.
(Continued)

*Primary Examiner* — Maria V Ewald
*Assistant Examiner* — Ethan A. Utt
(74) *Attorney, Agent, or Firm* — Julie Lapos-Kuchar

(57) ABSTRACT

Described herein is an article having a microsphere layer comprising a monolayer of microspheres, the monolayer of microspheres comprising a first area substantially free of microspheres and a second area comprising a plurality of randomly-distributed microspheres, wherein the monolayer of microspheres comprises a predetermined pattern, the
(Continued)

predetermined pattern comprises at least one of (i) a plurality of the first areas, (ii) a plurality of the second areas, and (iii) combinations thereof; and (b) a bead bonding layer disposed on the microsphere layer, wherein the plurality of microspheres are partially embedded in a first major surface of the bead bonding layer, wherein the article has a retroreflectivity ($R_a$) of less than 5.0 candelas/lux/square meter. Also disclosed herein are transfer carriers and methods of making the articles and transfer carriers.

18 Claims, 13 Drawing Sheets

(51) Int. Cl.
| | | |
|---|---|---|
| B32B 3/02 | (2006.01) | |
| B32B 7/06 | (2019.01) | |
| B32B 27/14 | (2006.01) | |
| B32B 27/32 | (2006.01) | |
| B32B 27/36 | (2006.01) | |
| C09D 5/00 | (2006.01) | |
| G02B 5/128 | (2006.01) | |
| C09D 7/40 | (2018.01) | |

(52) U.S. Cl.
CPC .............. *B32B 27/14* (2013.01); *B32B 27/32* (2013.01); *B32B 27/36* (2013.01); *C09D 5/006* (2013.01); *C09D 7/69* (2018.01); *G02B 5/128* (2013.01); *B32B 2307/412* (2013.01); *B32B 2307/536* (2013.01); *B32B 2307/72* (2013.01); *B32B 2307/732* (2013.01)

(58) Field of Classification Search
CPC ..... Y10T 428/24405; Y10T 428/24413; Y10T 428/24421; Y10T 428/2443; Y10T 428/25; Y10T 428/252; Y10T 428/254; Y10T 428/256; Y10T 428/257; Y10T 428/258; Y10T 428/259; Y10T 428/26; Y10T 428/263; Y10T 428/264; Y10T 428/265; Y10T 428/268; Y10T 428/269; Y10T 428/29; Y10T 428/2982; Y10T 428/2991; Y10T 428/2993; Y10T 428/2995; Y10T 428/2996; Y10T 428/2998; B32B 5/00; B32B 5/16; B32B 33/00; B32B 2264/00; B32B 2264/02; B32B 2264/0214; B32B 2264/0228; B32B 2264/0235; B32B 2264/025; B32B 2264/0292; B32B 2264/10; B32B 2264/101; B32B 2264/102; B32B 2264/1021; B32B 2264/1022; B32B 2264/1023; B32B 2264/1024; B32B 2264/105; B32B 2264/107; B32B 2264/12; B32B 2264/20; B32B 2264/202; B32B 2264/203; B32B 2264/2032; B32B 2264/30; B32B 2264/303; B32B 2264/40; B32B 2264/401; B32B 2264/402; B32B 2264/4021; B32B 2264/403; B32B 2264/50; B32B 2264/504; B32B 2307/40; B32B 2307/408; B32B 2307/416; B32B 2551/00; C09D 5/00; C09D 5/006; C09D 5/03; C09D 5/031; C09D 5/032; C09D 7/00; C09D 7/40; C09D 7/66; C09D 7/69; G02B 1/00; G02B 1/04; G02B 1/10; G02B 1/11; G02B 1/111; G02B 1/113; G02B 1/12; G02B 5/00; G02B 5/02; G02B 5/0205; G02B 5/021; G02B 5/0221; G02B 5/0226; G02B 5/12; G02B 5/126; G02B 5/128; A41D 13/00; A41D 13/01; A41D 31/00; A41D 31/04; A41D 31/32; A41D 31/325; E01F 9/00; E01F 9/50; E01F 9/506; E01F 9/512; E01F 9/518; E01F 9/524; E01F 9/576; E01F 9/578; E01F 9/588
USPC ........ 428/141, 143–145, 147–150, 323, 325, 428/327–331, 332, 334–336, 338, 339, 428/357, 402, 403–407; 359/515, 534, 359/536, 538, 540
See application file for complete search history.

(56) References Cited

U.S. PATENT DOCUMENTS

| | | |
|---|---|---|
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,700,305 A | 10/1972 | Bingham |
| 3,946,130 A | 3/1976 | Tung |
| 4,102,562 A | 7/1978 | Harper |
| 4,192,576 A | 3/1980 | Tung |
| 4,367,919 A | 1/1983 | Tung |
| 4,564,556 A | 1/1986 | Lange |
| 4,678,695 A | 7/1987 | Tung |
| 4,758,469 A | 7/1988 | Lange |
| 4,763,985 A | 8/1988 | Bingham |
| 4,772,511 A | 9/1988 | Wood |
| 4,849,265 A | 7/1989 | Ueda |
| 4,931,414 A | 6/1990 | Wood |
| 5,200,262 A | 4/1993 | Li |
| 5,283,101 A | 2/1994 | Li |
| 5,300,340 A | 4/1994 | Calhoun |
| 5,344,705 A | 9/1994 | Olsen |
| 5,503,906 A | 4/1996 | Olsen |
| 5,620,613 A | 4/1997 | Olsen |
| 5,620,775 A | 4/1997 | LaPerre |
| 5,645,938 A | 7/1997 | Crandall |
| 5,759,928 A | 6/1998 | Harper |
| 5,812,317 A | 9/1998 | Billingsley |
| 5,824,390 A | 10/1998 | Ochi |
| 5,896,227 A | 4/1999 | Toriumi |
| 5,900,078 A | 5/1999 | Yakuwa |
| 5,962,121 A | 10/1999 | Mori |
| 5,976,669 A | 11/1999 | Fleming |
| 5,988,821 A | 11/1999 | Tanaka |
| 6,040,044 A | 3/2000 | Takahashi |
| 6,153,128 A | 11/2000 | Lightle |
| 6,361,850 B1 | 3/2002 | Billingsley |
| 6,416,856 B1 | 7/2002 | Crandall |
| 6,735,789 B2 | 5/2004 | Kelleher |
| 7,111,949 B2 | 9/2006 | Parisi |
| 7,463,154 B2 | 12/2008 | Cortina |
| 8,003,197 B2 | 8/2011 | Yukawa |
| 8,420,217 B2 | 4/2013 | Johnson |
| 8,470,394 B2 | 6/2013 | Koppes |
| 10,239,277 B2 | 3/2019 | Kugel |
| 2005/0100709 A1 | 5/2005 | Bescup |
| 2006/0051559 A1 | 3/2006 | Sleeman |
| 2006/0188700 A1 | 8/2006 | Yukawa |
| 2007/0072198 A1 | 3/2007 | Kandimalla |
| 2008/0026193 A1 | 1/2008 | Koppes |
| 2008/0168591 A1 | 7/2008 | Feduzi |
| 2011/0045176 A1 | 2/2011 | Koppes |
| 2011/0193335 A1 | 8/2011 | Budd |
| 2011/0292508 A1 | 12/2011 | Huang |
| 2012/0050863 A1 | 3/2012 | Krishnan |
| 2013/0135731 A1 | 5/2013 | Smith |
| 2013/0295328 A1 | 11/2013 | Baran, Jr |

(56) References Cited

U.S. PATENT DOCUMENTS

| | | |
|---|---|---|
| 2014/0022641 A1 | 1/2014 | Yoon |
| 2015/0010723 A1 | 1/2015 | Krishnan |
| 2015/0343502 A1 | 12/2015 | Clark |

FOREIGN PATENT DOCUMENTS

| | | |
|---|---|---|
| CN | 101319113 | 12/2008 |
| CN | 201594149 | 9/2010 |
| CN | 204705735 | 10/2015 |
| JP | S60-205501 | 10/1985 |
| JP | 62-62301 | 9/1994 |
| JP | H 08-47995 | 2/1996 |
| JP | 09-137390 | 5/1997 |
| JP | 2988751 | 12/1999 |
| JP | 2002-014212 | 1/2002 |
| JP | 2003-182292 | 7/2003 |
| JP | 2004-062123 | 2/2004 |
| JP | 3498070 | 2/2004 |
| JP | 2004-138671 | 5/2004 |
| JP | 2005-165302 | 6/2005 |
| JP | 3158587 | 4/2010 |
| JP | 2010-182862 | 8/2010 |
| JP | 2017-508037 | 3/2017 |
| WO | 1996-16343 | 5/1996 |
| WO | 1998-28642 | 7/1998 |
| WO | 2000-79314 | 12/2000 |
| WO | 2002-103108 | 12/2002 |
| WO | 2004-005045 | 1/2004 |
| WO | 2004-113970 | 12/2004 |
| WO | 2007-046157 | 4/2007 |
| WO | 2013-043827 | 3/2013 |
| WO | 2013-126361 | 8/2013 |
| WO | 2014-055828 | 4/2014 |
| WO | 2014-210249 | 12/2014 |
| WO | WO-2014210249 A1 * | 12/2014 ........... C09D 127/12 |
| WO | 2015-123582 | 8/2015 |
| WO | 2015-175024 | 11/2015 |
| WO | 2016-053734 | 4/2016 |
| WO | 2017-027774 | 2/2017 |
| WO | 2017-106239 | 6/2017 |

OTHER PUBLICATIONS

Lewis Sr., "Hawley's Condensed Chemicals Dictionary", Van Nostrand Reinhold,1993, 3pages.

Miller, "A new derivation of post gel properties of network polymers", Macromolecules, 1976, vol. 09, No. 02, pp. 206-211.

International Search report for PCT International Application No. PCT/US2017/024711 dated Jul. 12, 2017, 5 pages.

* cited by examiner

ARTICLE FEATURING A PREDETERMINED PATTERN OF RANDOMLY DISTRIBUTED MICROSPHERES AND METHODS OF MAKING THE SAME

CROSS REFERENCE TO RELATED APPLICATIONS

This application is a national stage filing under 35 U.S.C. 371 of PCT/US2017/024711, filed Mar. 29, 2017, which claims the benefit of U.S. Application No. 62/315,285, filed Mar. 30, 2016, and U.S. Application No. 62/319,174, filed Apr. 6, 2016, the disclosures of which are incorporated by reference in their entirety herein.

TECHNICAL FIELD

An article comprising a monolayer of randomly distributed microspheres arranged in a predetermined pattern atop a surface is described along with a method of making the article.

SUMMARY

Figure 1:
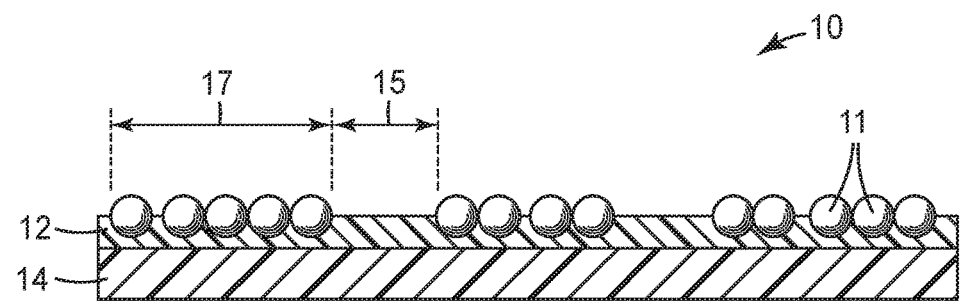
FIG. 1 is a cross-sectional view of an article according to one embodiment of the present disclosure.

There is a need for microsphere coated articles and transfer carriers that provide improvements in haze, clarity, and/or cost reduction, while achieving the surface durability (i.e., scratch and/or abrasion) and wear resistance provided by conventional microsphere coated articles and transfer carriers.

In one aspect, an article is described comprising:
(a) a microsphere layer comprising a monolayer of microspheres, the monolayer of microspheres comprising a first area substantially free of microspheres and a second area comprising a plurality of randomly-distributed microspheres, wherein the monolayer of microspheres comprises a predetermined pattern, the predetermined pattern comprises at least one of (i) a plurality of the first areas, (ii) a plurality of the second areas, and (iii) combinations thereof; and (b) a bead bonding layer disposed on the microsphere layer, wherein the plurality of microspheres are partially embedded in a first major surface of the bead bonding layer;

wherein the article has a retroreflectivity ($R_a$) of less than 5.0 candelas/lux/square meter.

In another aspect, a method of making an article is described, the method comprising:

providing a transfer polymer layer having a first major surface and a second major surface;

depositing a barrier layer material onto portions of the first major surface of the transfer polymer layer in a predetermined pattern;

partially embedding a plurality of microspheres into the portions of the first major surface of the transfer polymer layer not covered by the barrier layer material such that the plurality of microspheres at least partially protrude from the first major surface of the transfer polymer layer to form a patterned layer, wherein the patterned layer comprises at least one of (i) a plurality of first areas, wherein the first area is substantially free of microspheres, (ii) a plurality of second areas, wherein the second area comprises a plurality of randomly-distributed microspheres, and (iii) combinations thereof;

contacting the embedded layer of microspheres with a bead bonding layer; and removing the transfer polymer layer to form the article, wherein the article has a retroreflectivity ($R_a$) of less than 5.0.

In yet another aspect, an article is described comprising:
(a) a microsphere layer comprising a monolayer of microspheres, the monolayer of microspheres comprising a first area substantially free of microspheres and a second area comprising a plurality of randomly-distributed microspheres, wherein the monolayer of microspheres comprises a predetermined pattern, the predetermined pattern comprises at least one of (i) a plurality of the first areas, (ii) a plurality of the second areas, and (iii) combinations thereof;

the plurality of areas (i), (ii), and (iii) can be arranged randomly or pseudorandomly. Random and pseudorandom patterns include those found either using a deterministic causal process such that they satisfy at least one statistical test for randomness or by measurement of nondeterministic events. For example, printed random patterns repeat based on the size of the printing plate though they appear random when viewed at a size scale smaller than the printing plate. These patterns include both those visible and not visible to the unaided eye due to size and location of areas (i), (ii), and (iii).

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" encompass embodiments having plural referents, unless the content clearly dictates otherwise; and "and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Decorative protective surfaces find many consumer applications. Household appliances, automotive interiors and paints, consumer electronic devices, such as laptops and hand held devices, are all examples where consumers prefer materials that deliver considerable protection from scratches, wear and abrasion while retaining high cosmetics and aesthetics through the material's lifecycle. Low gloss matte surfaces are of particular interest to many consumers because of their aesthetic appeal.

Durable laminates and films comprised of glass beads are broadly known. These low gloss constructions typically consist of exposed glass bead surfaces that impart high durability and decorative properties to the construction. Typically, the beads are cascade coated or otherwise applied, such that the beads are randomly positioned in a closely packed monolayer, forming a continuous monolayer across the article surface. See U.S. Pat. No. 4,849,265 (Ueda et al.) and 5,620,775 (LaPerre). Typically, when beads are randomly applied to the surface of the article to form a continuous monolayer across the surface, depending on the bead size and size distribution, about 72% or more of the surface is covered with beads. Because these constructions comprise hard beads for durability and the beads cover a majority of the construction's surface, the articles can create visibility issues if an image (e.g., a logo, insignia, image, or colorful pattern) is located on the underside of the bead coated construction.

Further, thermoformable bead films (i.e., films comprising beads or microspheres that can be shaped by heat and pressure) on thermoformable substrates, such as polycarbonate are known, but those with improved optics (lower haze and higher clarity) while maintaining high hardness, have not been described previously.

The present application has identified ordered surfaces that comprise less than full coverage of beads while still providing the surface durability and wear resistance of the underlying surface similar to that provided by conventional, continuous monolayer bead-coated constructions. In some embodiments, the resulting article is thermoformable (i.e., able to be shaped using heat and pressure) and/or stain resistant.

Disclosed herein is a construction, which has an exposed surface having a pattern of microspheres, wherein the surface has mechanical durability (e.g., abrasion resistant and/or pencil hardness) and improved through visibility, and/or is less expensive than similar constructions that do not have the predetermined pattern of microspheres. These constructions, in one embodiment, may be applied to surfaces to alter the properties of the surface.

In one embodiment, the articles of the present disclosure are not retroreflective. Retroreflectivity of an article can be expressed in terms of its coefficient of retroreflectivity ($R_a$)

$$R_a = E_r * d^2 / E_s * A$$

where:
$E_r$=illumination incident upon the receiver
$E_s$=illumination incident upon a plane perpendicular to the incident ray of the specimen position, measured in the same units as $E_r$
d=distance from the specimen to the projector
A=area of the test surface The coefficient of retroreflectivity ($R_a$) is further described in U.S. Pat. No. 3,700,305 (Bingham). In one embodiment, the articles of the present disclosure have a coefficient of retroreflection of less than or equal to 10, 5, 1, 0.5, or even 0.3 candelas/lux/square meter measured at 0.2° observation angle and 5° entrance angle following ASTM E810-03 (2013) "Standard Test Method for Coefficient of Retroreflection of Retroreflective Sheeting Utilizing the Coplanar Geometry".

FIG. 1 is an illustration of a cross-section of one embodiment of an article of the present disclosure. Article 10 comprises a microsphere layer which comprises a monolayer of microspheres 11, wherein the plurality of microspheres are partially embedded into bead bonding layer 12. In one embodiment, the article comprises the plurality of microspheres embedded in the bead bonding layer and the bead bonding layer is disposed on a substrate layer. Such a construction is shown in FIG. 1 where bead bonding layer 12 is disposed on substrate layer 14. In some embodiments, the article may comprise additional layers between the bead bonding layer and the substrate as discussed below.

Substrate Layer

The substrate layer may provide additional support to the bead bonding layer and embedded microspheres during processing and handling. Alternatively or additionally, the substrate layer may be the surface the resulting article protects from abrasion, scratches, etc.

Examples of suitable substrate layers include, but are not limited to, those selected from at least one of fabrics (including synthetics, non-synthetics, woven and non-woven such as nylon, polyester, etc.); polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like; and open-cell foams and closed cell foams, including for example, polyurethane foam, polyethylene foam, foamed rubber, and the like. The substrates may, for example, be in the form of a clothing article or footwear; automobile, marine, or other vehicle seat coverings; automobile, marine, or other vehicle bodies; orthopedic devices; electronic devices (including, for example, track pads, and outer surface cover), hand held devices, household appliances; sporting goods; and the like.

In one embodiment, the substrate layer is a thermoformable material, which can enable thermoforming of the resulting article. The thermoformable material should have a glass transition temperature below the thermoforming temperature. In one embodiment, the substrate comprises a material having a glass transition temperature greater than or equal to 60° C., 70° C., or even 80° C.; and less than or equal to 160° C., 150° C., 140° C., 130° C., 120° C., or even 110° C.

In one embodiment, the substrate has a thickness of at least 5, 10, 20, 25, 50 or even 75 micrometers. In one embodiment, the substrate has a thickness of at most 25 mm or even 50 mm.

Bead Bonding Layer

The plurality of microspheres are held in place on top of the substrate via a bead bonding layer. The bead bonding layer is typically an organic polymeric material. It should exhibit good adhesion to the microspheres. It is also possible that an adhesion promoter for the microspheres could be added directly to the bead bonding layer itself as long as it is compatible within the process window for disposing the bead bonding layer on the surfaces of the microspheres.

Materials useful in the bead bonding layer include, but are not limited to those selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, polymer matrix composites, and combinations thereof. In some embodiments, the polymer matrix composites include nanoparticles in resins, fibers in resins, and the like. Combinations can include any combinations of materials, such as interpenetrating networks, dual cure systems, and the like.

In one embodiment of the present disclosure, the bead bonding layer of the present disclosure comprises at least one of (i) a resin comprising a fluorine-containing polymer, (ii) a linear resin, (iii) a resin having low crosslink densities, (iv) a resin having high crosslink densities, and (v) combinations and blends thereof. As used herein, resin refers to a solid or highly viscous material comprising a polymer, and among other things, additives such as pigments or colorants such as metallic flakes, rheological modifiers, UV stabilizers, antioxidants, etc. Use of such resins in the bead bonding layer can enable stain-resistance and/or thermoforming capabilities to the article.

For example, a resin having high crosslink densities can impart stain-resistance to the resulting article. A linear resin or resin having low crosslink densities can be thermoformed, while adding a fluorine-containing polymer (such as for example a linear fluorine-containing polymer such as THV) can impart stain resistance. For example, in a dual cure system, a resin having low crosslink densities, and optionally comprising a fluorinated polymer, is thermoformed and a subsequent crosslinking step is used to generate resin having high crosslink densities, which may provide stain-resistance.

In one embodiment, the bead bonding layer resin comprises a fluorine-containing polymer, which can impart stain resistance to the article. In one embodiment, it has been found that stain resistance characteristics may be related to the amount and location of the fluorine atoms in the fluorine-containing polymer of the bead bonding layer. For example, improved stain resistance may occur when the fluorine atoms are located along the polymer backbone (i.e., the main chain of the polymer). The amount of fluorine atoms present in the polymer may be calculated by taking into account both the weight ratios of the monomers included as well as the fluorine content by weight of each monomer along its polymerizable chain length, including fluorine atoms that are present on those atoms once removed from the polymerizable chain. As an example, a copolymer of tetrafluoroethylene, hexafluoropropylene, and vinylidene fluoride in a weight ratio of 10:40:50 would have a backbone fluorine content of 67.7%. This was calculated as follows.

Tetrafluoroethylene: $C_2F_4$, molecular weight 100.01, monomeric fluorine content 76.0%, weight ratio 10%;
Hexafluoropropylene: $C_3F_6$, molecular weight 150.02, monomeric fluorine content 76.0%, weight ratio 40%;
Vinylidene fluoride: $C_2H_2F_2$, molecular weight 64.03, monomeric fluorine content 59.3%, weight ratio 50%.

$$(0.1 \times 0.76) + (0.4 \times 0.76) + (0.5 \times 0.593)] \times 100 = 67.7\%.$$

Note that this calculation includes the fluorine atoms on the trifluoromethyl group of hexafluoropropylene since it is only one atom removed from the polymerizable chain of the hexafluoropropylene monomer.

In some embodiments of the present disclosure, the fluorine content along the polymeric backbone of the fluorine-containing polymer is from at least 15%, 20%, 25%, 27%, 30%, or even 40% and at most 76%, 72% or even 70% by weight.

Although there may be fluoropolymer-containing resins which possess the desired fluorine content they may not exhibit the desired level of stain resistance to highly staining materials, such as yellow mustard, at elevated temperature and humidity. Without wishing to be bound by theory, it is believed that those materials in which the fluorine atoms reside solely, or predominately, in pendent side chains or end group do not exhibit the desired stain resistance characteristics of the articles in one embodiment of the present disclosure. In contrast, materials in which the fluorine atoms reside solely, or predominately, in the polymer backbone or within one carbon away from the backbone may provide adequate stain resistance to yellow mustard at elevated temperature and humidity.

In some embodiments, fluorine-containing polymer having certain glass transition temperatures (Tg) are useful in the present disclosure. Without being bound by theory, it is believed that the higher the Tg, the more resistant it is to staining of yellow mustard. For example, in some embodiments, fluorine-containing polymer having a Tg of at least 60° C., 70° C., or even 80° C. are useful in the present disclosure. In some embodiments, fluorine-containing polymers having a Tg of no more than 150° C., or even 100° C. are useful in the present disclosure.

Fluorine-containing polymers useful in the bead bonding layer including, but are not limited, to those selected from at least one of the following: fluoroolefins and fluorourethanes. Fluoroolefins include elastomeric fluoroolefin polymers, thermoplastic fluoroolefin polymers, elastomeric fluoroolefin polymers crosslinked with multifunctional acrylates or multifunctional amines, and thermoplastic fluoroolefin polymers crosslinked with multifunctional amines. Fluorourethanes include crosslinked fluorinated polyurethanes. Any combination of these materials may also be used so long as they are miscible in one another. In some embodiments, fluorine-containing polymers useful in the present disclosure may also include other halogens, such as for example chlorine. An exemplary fluorine-containing polymer useful in the present disclosure includes chloro trifluoroethylene (CTFE). Any combination of these materials may also be used so long as they are miscible in one another.

Examples of useful elastomeric fluoroolefin polymers include, but are not limited to, bromine-containing copolymers of tetrafluoroethylene, hexafluoropropylene, and vinylidene fluoride such as that available under the trade designation 3M DYNEON PEROXIDE CURE FLUOROELASTOMER FPO 3740 from 3M Company, St. Paul, Minn.; and ultra-low viscosity fluoropolymers such as that obtained as an experimental or developmental product under the trade designation 3M DYNEON FLUOROELASTOMER E-20575 from 3M Company, St. Paul, Minn. Examples of useful thermoplastic fluoroolefin polymers include, but are not limited to, copolymers of tetrafluoroethylene, hexafluoropropylene, and vinylidene fluoride such as that available under the trade designation 3M DYNAMAR POLYMER PROCESSING ADDITIVE FX 5912 from 3M Company, St. Paul, Minn.

The fluorine-containing polymers may be used in a resin to form the bead bonding layer and crosslinked. Examples of useful co-crosslinked fluoropolymers include, but are not limited to, elastomeric fluoroolefins co-reacted with multifunctional acrylates, such as pentaerythritol triacrylate, available under the trade designation SARTOMER SR 344 from Sartomer USA, LLC, Exton, Pa., and trimethylolpropane triacrylate, available under the trade designation SARTOMER SR 351H from Sartomer USA, LLC, Exton, Pa. may also be used. Examples of useful fluoropolymers crosslinked with amines include, but are not limited to, thermoplastic fluoroolefins reacted with multifunctional primary amines such as that available under the trade designation JEFFAMINE T403 from Huntsman Corporation, The Woodlands, Tex., and polyetherimines such as that obtained under the code number 32034100 from ACROS Organics, a subsidiary of Thermo Fisher Scientific, Minneapolis, Minn. A useful, non-limiting, example of a fluorourethane is that derived from the reaction of a polyfunctional, aliphatic isocyanate resin based hexamethylene diisocyanate (HDI), such as that available under the trade designation DESMODUR N3300A from Bayer Materials Science LLC, Pittsburgh, Pa. and a fluorinated polydroxy-containing polymer such as that available under the trade designation ZEFFLE GK 570 from Daikin America, Orangeburg, N.Y. In some embodiments, useful non-limiting examples of fluorine-containing polymer include those derived from a solid, copolymer of fluoroethylene and vinyl ether available under the trade designation of LUMIFLON LF-200F from AGC Chemicals America, Exton, Pa. These fluorinated polyhydroxy polymers can be crosslinked for example with isocyanates. In one embodiment, stain resistance of the article may be achieved by using bead bonding layer made of a resin having a high crosslink density. As used herein a high crosslink density refers to a resin having a high system functionality using the calculations as discussed in U.S. Pat. No. 8,420,217 (Johnson).

The "System Functionality" is defined as the total moles of equivalents of the reactive groups in a condensation divided by the total moles of the two components. For example, in a polyurethane formation the total moles of equivalents of hydroxyl and isocyanate groups is divided by the total moles of the polyols and the multifunctional isocyanates. In a polyurea formation, the total moles of equivalents of amine and isocyanate groups is divided by the total moles of the polyamines and the multifunctional isocyanates. In order to obtain a resin having a high crosslink density, the system functionality should be greater than 2.4, 3.0, 4.0. 5.0, or even 10, which means it has substantial crosslinking. If the system functionality is 2.0 or less, little or no crosslinking is achieved and the material is typically thermoformable. When the system functionality is between the above mentioned ranges, the resin is lightly crosslinked Typically, a higher system functionality leads to greater crosslinking and a stiffer system. As used herein "moles of equivalents" refers to the moles of functional groups. Thus, for a polyol it is the moles of equivalents of hydroxyl groups (OH), and for an isocyanate it is the moles of isocyanate groups (NCO). For example, for a diol or diisocyanate, the moles of equivalents would equal two times the moles of the diol or the diisocyanate, respectively. Similarly, for a triol, the moles of equivalents would equal three times the moles of the triol. "Mole fraction of equivalents" for a particular polyol is the ratio of moles of equivalents of that particular polyol divided by the moles of equivalents for all polyols in the combination of polyols. Based on this definition, the sum of the mole fraction of equivalents for all polyols in the combination is 1. The crosslinker has a functionality greater than 2.0, e.g., a functionality of at least 3. In some embodiments, the crosslinker may have a higher functionality, e.g., 4. In some embodiments, the crosslinker is a low molecular weight triol, e.g., glycerol (i.e., propane-1,2,3-triol), Other exemplary crosslinkers include trimethylolpropane, 1,2,6-hexanetriol, and triethanol amine. In some embodiments, a combination of crosslinkers may be used. In some embodiments, the crosslinker is a triisocyanate.

System functionalities of greater than 2.0-2.15 are less crosslinked than those with system functionalities greater than 2.4. Those systems with higher functionality are more crosslinked. The combination of high system functionality with equivalent weight of isocyanate and/or polyols is less than 1000 is preferred for rigid applications.

Generally, the ratio of the moles of equivalents of isocyanate groups over the moles of equivalents of hydroxy groups (NCO/OH) should be approximately 1, e.g., between 0.7 and 1.3, inclusive, and in some embodiments between 0.9 and 1.1, inclusive. If NCO/OH ratio is greater than 1, the crosslink density will increase, leading to higher hardness and lower elongation. If NCO/OH ratio is less than 1, the system will have a lower crosslink density, leading to softer system and greater elongation. Thus, the exact ratio of NCO/OH can be adjusted to obtain desired mechanical properties. In addition, decreasing the NCO/OH ratio tends to make the system more hydrophilic and will typically have greater moisture vapor transmission, which may be desirable in application benefiting from a "breathable" structure.

In some embodiments, it may be desirable to use an NCO/OH ratio of greater than 1 to ensure complete crosslinking. For example, the polyols are typically hygroscopic and may carry water into the system. This water tends to react quickly with available NCO sites making them unavailable for crosslinking with the hydroxy groups of the polyols. In some embodiments, an NCO/OH ratio of at least 1.02, (e.g., between 1.02 and 1.07, inclusive) and in some embodiments, at least 1.04 (e.g., between 1.04 and 1.06, inclusive) may be used.

The resin having a high crosslink density may be derived from an ionizing radiation-curable composition comprising a suitable mixture of prepolymers, oligomers and/or monomers having a polymerizable unsaturated bond(s) or an epoxy group(s) in the molecule thereof.

Prepolymers and oligomers include: unsaturated polyesters, such as condensates of unsaturated dicarboxylic acids with polyhydric alcohols; methacrylates, such as polyester methacrylates, polyether methacrylates, polyol methacrylates, and melamine methacrylates; acrylates, such as polyester acrylates, epoxy acrylates, urethane acrylates, polyether acrylates, polyol acrylates, and melamine acrylates; and cationically polymerizable epoxy compounds.

Urethane acrylates include, for example, polyether urethane (meth)acrylates represented by the following general formula which are prepared, for example, by reacting polyether diol with a hydroxyl-containing acrylate and a diisocyanate:

$$CH_2=C(R^1)-COOCH_2CH_2-OCONH-X-$$
$$NHCOO-[-CH(R^2)-(CH_2)_n-O-]_m-$$
$$CONH-X-NHCOO-CH_2CH_2OCOC$$
$$(R^1)=CH_2$$

wherein $R^1$ and $R^2$ each independently represent a hydrogen atom or a methyl group; X represents a diisocyanate residue; n is an integer of 1 to 3; and m is an integer of 6 to 60.

Diisocyanates usable as the polyether urethane (meth) acrylate include, for example, isophorone diisocyanate, dicyclohexylmethane diisocyanate, hexamethylene diisocyanate, diphenylmethane diisocyanate, and tolylene diisocyanate. Polyether diols include polyoxypropylene glycol, polyoxyethylene glycol, and polyoxytetramethylene glycol, these polyether diols having a number average molecular weight of 500 to 3,000 g/mol.

Monomers usable for the formation of the ionizing radiation-curable resin include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate 2-(N,N-dimethylamino)ethyl methacrylate, 2-(N,N-dibenzylamino)methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a branch thereof, for example, trimethylolpropane trithioglycolate, trimethylolpropane trithiopropylate, and pentaerythritol tetrathioglycol.

A photopolymerization initiator may be added to the ionizing radiation-curable composition along with other additives (such a pigments, stabilizers, etc.). Photopolymerization initiators include acetophenones, benzophenones, Michler's benzoyl benzoate, α-aminoxime ester, tetramethylthiuram monosulfide, thioxanthones, aromatic diazonium salt, aromatic sulfonium salt, and metallocene. n-Butylamine, triethylamine, tri-n-butylphosphine or the like may be further added as a photopolymerization accelerator (a sensitizer). The amount of the photopolymerization initiator added is preferably 1 to 10% by weight from the viewpoint of good curability. The photopolymerization initiator is preferably a benzophenone photopolymerization initiator from the viewpoint of good curability.

The ionizing radiation-curable composition may be cured to form the bead bond layer. The term "ionizing radiation" used herein refers to electromagnetic radiations or charged particle beams which have sufficient energy capable of polymerizing or crosslinking molecules, and generally refers to, for example, ultraviolet light or electron beam. In one embodiment of the present disclosure, the ionizing radiation-curable resin is cured upon exposure to an electron beam to form an electron beam-cured resin having high hardness.

If the presently disclosed articles are to be thermoformable, it is preferred that the bead bonding layer is not crosslinked (i.e., a linear resin) or are very lightly crosslinked (i.e., a resin having low crosslink densities). With respect to thermoforming an article, lightly crosslinked materials are preferred over highly crosslinked materials because they produce less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation and to withstand deformation at very high temperatures without failing. In some embodiments, lightly crosslinked materials are preferred over non-crosslinked materials to give better resistance to chemicals and resistance to creep and other dimensional instability over time.

Exemplary linear materials include: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.

Crosslink density is inversely related to the average molecular weight per crosslink point.

In some embodiments for example in the use of acrylates, the cross link density can be calculated as disclosed in U.S. Pat. No. 6,040,044, using the equation:

Average molecular weight between crosslinks=molecular weight of whole resin ($m$)/number of crosslink points In this equation, the molecular weight of the whole resin is Σ(number of moles of each component incorporated×molecular weight of each component), and the number of crosslink points is Σ[2(number of functional groups in each component−1)×number of moles of each component].

In another embodiment, the number of crosslink points can be calculated as the density of the crosslink points multiplied by the volume of the material. The density of crosslink points can be calculated using the method described in *Macromolecules*, Vol. 9, No. 2, pages 206-211 (1976). One case involves step-growth copolymerizations with arbitrary functional groups of type A with some molecules having more than two functional groups per molecule and functional groups type B with molecules all having two functional groups per molecule. In this case, the density of crosslink points joining m chains, denoted $[X_m]$, can be calculated with the equation:

$$[X_m] = \sum_{f_i=m}^{f_k} [A_{f_i}]_0 P(X_{m,f_i})$$

which is equation 49 in the *Macromolecules* reference. In this equation, $f_i$ is the degree of functionality of a comonomer, $f_k$ is the highest functionality in the system, m ranges from 3 to $f_k$, $[A_{f_i}]_0$ is the initial concentration of comonomers with functionality $f_i$, and $P(X_{m,f_i})$ is the probability that a monomer of functionality $f_i$ acts as a crosslink point for exactly m chains. The total crosslink density, $[X]$, is the sum of all $[X_m]$ from m=3 to $f_k$. The probability $P(X_{m,f_i})$ can be calculated by the equation:

$$P(X_{m,f_i}) = \binom{f_i}{m} P(F_{A^{out}})^{f_i-m}[1-P(F_{A^{out}})]^m$$

which is equation 45 in the *Macromolecules* reference, where $P(F_{A^{out}})$ is the probability that an arbitrary functional group is not chemically bound to a complementary chemical group attached to an infinite polymer network. This probability can be found by numerically solving the equation:

$$rp^2 \Sigma_i a_{f_i} P(F_{A^{out}})^{f_i-1} - P(F_{A^{out}}) - rp^2 + 1 = 0$$

which is equation 22 in the *Macromolecules* reference. In this equation, p is the reaction conversion of the chemical functionalities of type A, r is the molar ratio of functional groups A to functional group B, and $a_f$ is the mole fraction of functional groups on molecules with functionality f.

Similar equations are taught in the *Macromolecules* reference that can be used to calculate the number of crosslinking points in other types of chemical systems. These other types of chemical systems include chain addition polymerizations or step-growth copolymerizations involving components having functionality greater than two for two distinct types of functional groups.

In one embodiment, the resins having low cross link densities are those resins comprising lightly crosslinked material having a molecular weight between crosslinks of greater than about 2,800 g/mol, 4,000 g/mol, 10,000 g/mol, 50,000 g/mol, 100,000 g/mol, 200,000 g/mol, 1,000,000 g/mol, or even 20,000,000 g/mol.

The average molecular weight (e.g., number average) per crosslink can be calculated as described above for the highly crosslinked resin. It should be noted that these calculations do not account for moisture introduced into the reaction as a contaminant, which can lower the actual crosslink density compared to the calculated expected crosslink density. In one embodiment, a slight excess of moles of isocyanate functionality can be added relative to the moles of hydroxyl or amine functionality to account for contaminant moisture. Also, these equations do not account for moisture curing that may occur when, for example, excess moles of isocyanate functionality are added relative to the moles of hydroxyl or amine functionality, and this moisture curing can increase the actual crosslink density compared to the expected crosslink density.

In some embodiments, a bead bonding layer may comprise a resin that is able to be thermoformed and enable stain resistance in the resulting article. Such a bead bonding layer can be derived from an actinic radiation reactive polyurethane dispersion. Such reactive polyurethanes include those materials sold under the trade designations "BAYHYDROL UV XP" and "BAYHYDROL UV" commercially available from Bayer Material Science LLC, Pittsburgh, Pa.; "LUX 250" commercially available from Alberdingk Boley, Greensboro, N.C.; "MIWON MIRAMER WB 2812" commercially available from Miwon Specialty Chemical Co., Ltd., Korea; and "EBECRYL 4150" and "EBECRYL 4250", both commercially available from Allnex.

In one embodiment, the actinic radiation reactive polyurethane is derived from a reaction product of polyester polyol, diisocyanates and/or triisocyanates, and dihydroxy containing carboxylic acid. In some embodiments, a dispersion comprising the actinic radiation reactive polyurethane has a pH of greater than or equal to 6.5. In some embodiments, a dispersion comprising the actinic radiation reactive polyurethane has a pH of less than or equal to 10.0.

In one embodiment, the bead bonding layer comprising the actinic radiation reactive polyurethane includes a crosslinker to crosslink the bead bonding layer. Useful crosslinkers include polyisocyanates, preferably water dispersible polyisocyanates, and polyaziridines. In some embodiments, blends of aziridines and water dispersible isocyanates are possible. Other crosslinkers, such as carbodiimides and blocked isocyanates, may also be used.

In some embodiments, the actinic radiation reactive polyurethane is blended with a multi-functional acrylate. A variety of different multi-functional acrylates are useful. In some embodiments, it is desirable that the multi-functional acrylates have a high level of functionality and relatively lower molecular weight. Exemplary multi-functional acrylates include: ethoxylated trimethylol propane triacrylate, trimethylol propane triacrylate, pentaerythritol tri/tetracrylate, dipentaerythritolhexaacrylate, and tris(2-hydroxy ethyl) isocyanurate triacrylate. While liquid multi-functional acrylates can be used, solid multi-functional acrylates, such as tris(2-hydroxy ethyl) isocyanurate triacrylate, can also be used and used in an actinic radiation reactive polyurethane dispersion. Acrylate functional polyols are also available from Allnex.

The actinic radiation reactive polyurethane dispersion may be cured to form the bead bond layer, which can result in a highly cross-linked bead bond layer, which can impart stain resistance of the resulting article. Exemplary curing agents include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations, such as those using isocyanates, are enhanced by heating. Free radically polymerizable groups, such as (meth)acrylates, are stable within a range of temperatures commonly used for condensation polymerization.

In some embodiments, a photoinitiator is used with the actinic radiation reactive polyurethane. For example, in some embodiments, curing is accomplished by actinic radiation curing of a thermoformed article. Exemplary actinic radiation curing includes curing by exposure of the thermoformed article to an ultra violet (UV) light source, an electron beam source, and the like. In some embodiments, curing is accomplished by thermally initiated curing.

In some embodiments, a resin comprising a fluorine-containing polymer and having a high crosslinking density is used as the bead bonding layer, which can impart stain resistance to the resulting article.

In one embodiment, the bead bonding layer is made comprises pendent hydroxyl groups which can react with polyisocyanates to build molecular weight through condensation polymerization. The resin is also selected to have free radically polymerizable functionality such as (meth)acrylate groups, so that the presently disclosed materials may be thermoformed and then free radically crosslinked to make a thermoset article. As a result, the surface of the article becomes more rigid leading to higher pencil hardness values and more crosslinked so that solvents and staining agents are less able to penetrate the surface. The use of fluorine-containing polymers as described above (e.g., polymers comprising fluorine along the polymer backbone or within one carbon atom of the backbone) in combination with the free radical crosslinking leads to resistance to staining by mustard and other colored staining agents.

In some embodiments, the resin comprises a partially fluorinated polymer derived from at least one fluorine containing monomer and two or more non-fluorinated monomers having at least one active hydrogen functional group, where at least one, but not all of the active hydrogen functional groups are reacted with at least one curing agent having latent functionality, and where the curing agent comprises polyisocyanate. Such partially-fluorinated polymers may be derived from the structure of Formula (I):

(I)
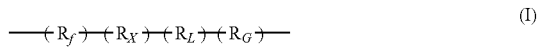

where $R_f$ must be present as 30 mol % to 60 mol % of the polymer; $R_X$ must be present as 5 mol % to 20 mol % of the polymer; and $R_L$ and $R_G$ comprises the remaining mol % of the polymer. In some embodiments, $R_f$ must be present as 30 mol % to 60 mol % of the polymer; $R_X$ must be present as 5 mol % to 15 mol % of the polymer; and $R_L$ and $R_G$ comprises the remaining mol % of the polymer. Further where $R_f$ in Formula (I) is selected from at least one of the following or combinations thereof:

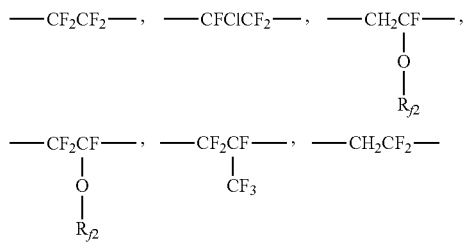

where $R_{f2}$ is fluoroalkyl having 1 to 8 carbon atoms.
And also where $R_X$ in Formula (I) is

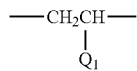

where $Q_1$ is

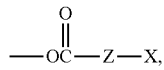

or —O—Z—X
where Z is optional, or when present, is selected from an alkylene, arylene, aralkylene or alkarylene, in which any are optionally substituted with N, O or S; and where X is OH, or SH, or $NHR_1$, where $R_1$ is H, alkyl or cycloalkyl having 1 to 22 carbon atoms.
And also where $R_L$ in Formula (I) is

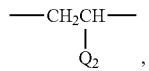

where $Q_2$ is,

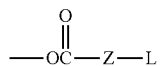

or, —O—Z-L
where Z is optional, or when present, is selected from an alkylene, arylene, aralkylene, or alkarylene, in which any are optionally substituted with N, O or S and L is

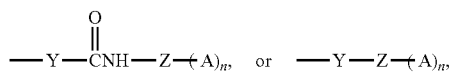

where Y is O, S, $NR_1$, where $R_1$ is H, or alkyl or cycloalkyl having 1 to 22 carbon atoms, and A is

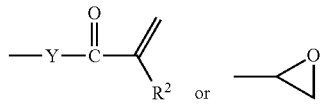

where n is 1 to 5 and $R_2$ is H or $CH_3$.
$R_G$ is

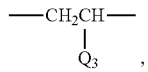

where $Q_3$ is

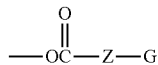

or —O—Z-G
where Z is optional, or when present is selected from an alkylene, arylene, aralkylene, or alkarylene in which any are optionally substituted with N, O or S. and where G is aryl, alkyl, aralkyl or alkaryl.
In any of the foregoing embodiments, units $R_f$, $R_X$, $R_L$, $R_G$ may be arranged head-head, head-tail, tail-head, or tail-tail as in:

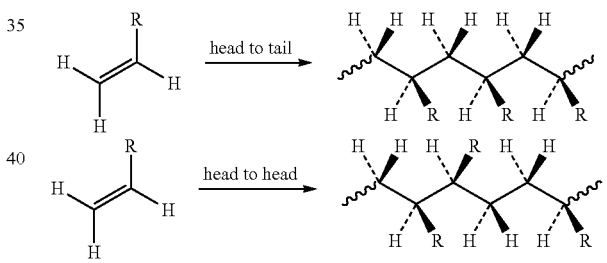

CN 101314684 and CN 101319113, for example, disclose ZEFFLE GK 570 as having a fluorine content of 35-40%. JP 2010182862, for example, discloses ZEFFLE GK 570 as having a fluorine content of 35%.

The resin may include chlorotrifluoroethylene (CTFE) polyhydroxy containing polymers such as those available under the trade designation LUMIFLON from Asahi Glass Chemicals American, Bayonne, N.J. In some embodiments, the resin may include nonfluorinated polyols in addition to fluorinated polyols, as long as they are miscible in solution and in the dried and cured products. The binder resin may include monoalcohols, in limited amounts. The monoalcohol may also possess latent functionality, such as acrylate groups (e.g. hydroxyethylacrylate), or be fluorinated to enhance chemical resistance (e.g. N-methyl, N-butanol perfluorobutane sulfonamide).

The resin as described above may be cured to from the bead bonding layer. Exemplary curing agents include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations and/or thermal catalysis, such as those using isocyanates, are enhanced by heating. Free radically polymerizable groups, such as (meth)acrylates, are stable within a range of temperatures commonly used for condensation polymerization. In some embodiments, useful curing agents include those having isocyanate or epoxy functionality combined with (meth)acrylate functionality. Preferable curing agents useful in the present disclosure include those having isocyanate functionality combined with (meth)acrylate functionality. Examples include 1,1-bis(acryloyloxymethyl) ethyl isocyanate (BEI), isocyanatoethyl acrylate (AOI), and isocyanatoethyl methacrylate (MOI) which may be obtained from CBC America Corp, Commack, N.Y., and DESMOLUX D-100, which may be obtained from Bayer, Pittsburgh, Pa., and LAROMER 9000 available from BASF. When using polyisocyanates as curing agents, these polyisocyanates may also function as crosslinkers, where crosslinking means having two or more isocyanate groups that are capable of reacting with two different polymeric chains.

These curing agents preferably include latent functionality such that the thermoformable articles can be converted into thermoset articles. For example, in some embodiments, curing is accomplished by actinic radiation curing of the thermoformed article. Exemplary actinic radiation curing includes curing by exposure of the thermoformed article to an ultraviolet (UV) light source. Various photoinitiators can be used in the presently disclosed thermoformed articles. In some embodiments, it is preferable to use photoinitiators having longer wavelength absorption. Alternatively, in some embodiments, curing is accomplished by exposure of the thermoformed article to electron beam irradiation. In some embodiments, curing is accomplished by thermally initiated curing. Photoinitiators useful in the present disclosure include those commercially available under the trade designations "IRGACURE" (e.g. Irgacure 651) and "DAROCURE" (e.g. Darocure 1173) from BASF, Ludwigshafen, DE and "ESACURE" (e.g. Esacure KB1) from Lamberti, Gallarate, IT. Suitable UV curing apparatus and the light sources are well known to those skilled in the art and include for example those commercially available under the trade designation "Fusion" from Heraus Noblelight Fusion UV, Gaithersburg, Md. Crosslinkers useful in the present disclosure include polyisocyanates which are useful for reaction with the microspheres as well as to the pendent hydroxyl groups on the fluorine containing polymer. An examples of such polyisocyanates is given below in Formula (II)

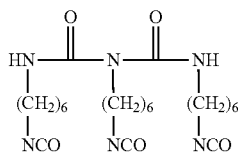
(II)

Exemplary compounds of Formula (II) are commercially available. Exemplary compounds of Formula (II) can be obtained from Bayer Polymers LLC (Pittsburgh, USA). One such compound is obtainable under the trade designation DESMODUR N100.

Other exemplary polyisocyanates include those having structures according to the following Formulas (III) and (IV):

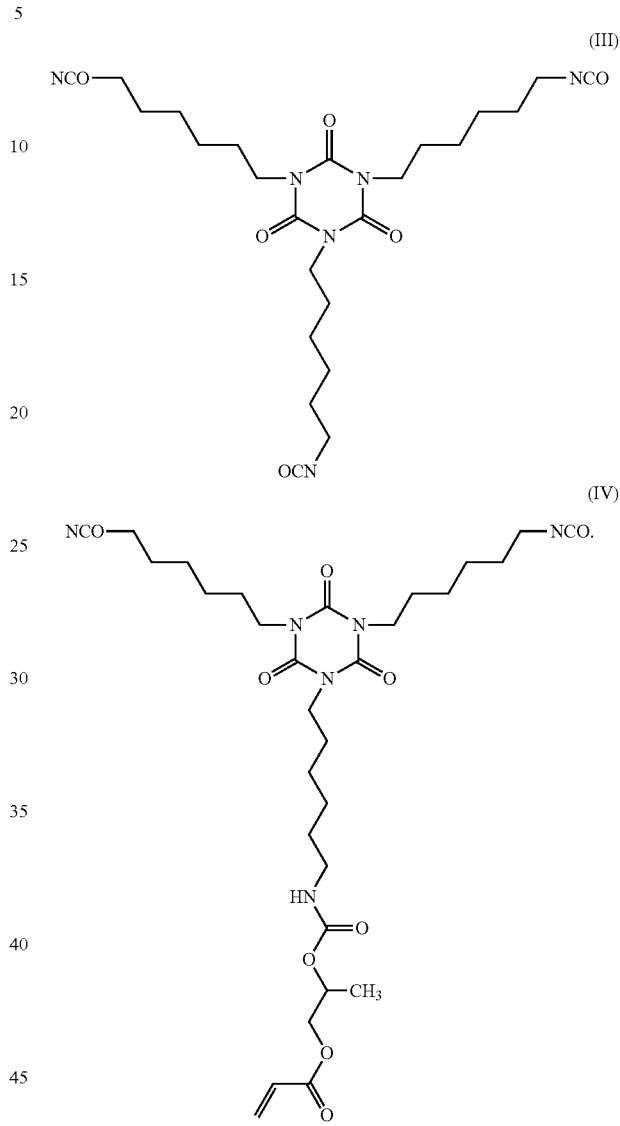

Many of the multifunctional isocyanates of greater than 2 functionality, including that of Formula (III), exist as a distribution of materials. For instance, hexamethylene diisocyanate based isocyanate oligomers such as biuret multi-isocyanates (for instance those available under the trade designation DESMODUR N100) exist as a mixture of hexamethylene diisocyanate, hexamethylene diisocyanate biuret trimers, hexamethylene diisocyanate biuret pentamers, hexamethylene diisocyanate biuret heptamers, and so on. The same is true for hexamethylene diisocyanate based isocyanurate multi-isocyanates (for instance those available under the trade designation DESMODUR N3300). Biuret and isocyanurate multi-isocyanates may be based on other diisocyanates such as isophorone diisocyanate, or toluene diisocyanate. Diisocyanates such as H12MDI (available under the trade designation DESMODUR W, Bayer) may also be employed. Other multifunctional isocyanates which are useful as crosslinkers include those with additional acrylate functionality, for example that commercially available under the trade designation DESMODUR D100 (from Bayer, presently commercially available under the trade designation EBECRYL 4150 from Allnex, Alpharetta, Ga.). DESMODUR D100 has an NCO functionality of about 2 and can act as a crosslinker.

The bead bonding layer can be formed, for example, out of solution, aqueous dispersion, or 100% solids coating such as via hot melt, extrusion, or reactive coating. Use of solvent coating or aqueous dispersions can provide advantages such as lower processing temperatures which in turn permits the use of materials such as polyethylene in the transfer polymer layer described below. Lower process temperatures also generally result in decreased thermal stress in the final articles. In addition, the use of certain higher boiling solvents may advantageously provide articles with reduced amounts of entrapped air in the dried and cured bead bonding layer.

The bead bonding layer may be transparent, translucent, or opaque. It may be colored or colorless. The bead bonding layer may, for example, be clear and colorless or pigmented with opaque, transparent, or translucent dyes and/or pigments. In some embodiments, inclusion of specialty pigments, such as for example metallic flake pigments, can be useful.

In one embodiment, the thickness of the bead bonding layer is at least 50% of the average diameter of the microspheres. Exemplary thicknesses for the bead bonding layer include: thicknesses of at least 10, 25, 50, 100, or even 250 µm (micrometers) or even more (e.g., at least 1 millimeter, at least 1 centimeter, or even 1 meter).

Microsphere Layer

The microsphere layer comprises a plurality of microspheres. The microspheres useful in the present disclosure comprise glass, glass ceramics, ceramics, polymers, metals, and combinations thereof. Glass is an amorphous material, while ceramic refers to a crystalline or partially crystalline material. Glass ceramics have an amorphous phase and one or more crystalline phases. These materials are known in the art.

In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the particles are perfect spheres. Some are oblate, some are melted together and some contain small bubbles.

In one embodiment, the microspheres are plastic particles. The plastic particles selected should comprise a hardness greater than the substrate surface to protect the underlying substrate surface. One exemplary plastic particle includes polyurethane, polystyrene, acrylic and methacrylic acid ester polymers and copolymers (e.g., poly(methyl methacrylate)), and polyurea spheres.

In one embodiment, the microspheres comprise a surface modification as is known in the art to improve the adhesion to the bead bonding layer. Such treatments include those selected from the group consisting of silane coupling agent, titanate, organo-chromium complex, and the like, to maximize the adhesion of the microspheres to the first polymer layer. Preferably, the coupling agent is a silane such as aminosilane, glyoxide silane, or acrylsilane.

In one embodiment, the treatment level for such coupling agents is on the order of 50 to 700 parts by weight coupling agent per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the coupling agent with the microsphere, followed by drying in a tumbler or auger-fed dryer to prevent the microspheres from sticking together. One skilled in the art would be able to determine how to best treat the microspheres with the coupling agent.

In one embodiment, the microspheres of the present disclosure have a Knoop hardness of at least 1,300 kg/mm$^2$, or even 1,800 kg/mm$^2$. The "Knoop hardness" as used herein is an indentation of microhardness measured by using a Knoop indenter; it is a value obtained by dividing the applied load with which a rhombic indentation is formed on the surface of a sample, by the projected area of the indentation computed from the long diagonal of the permanent indentation. The method for measuring the Knoop hardness is described in ASTM C849-88 (2011) "Standard Test Method for Knoop Indentation Hardness of Ceramic Whitewares".

The microspheres for use in the present invention are substantially spherical, for example, having a sphericity of at least 80%, 85%, or even 90%, where sphericity is defined as the surface area of a sphere (with the same volume as the given particle) divided by the surface area of the particle, reported as a percentage.

Preferable examples of the spherical particles include fused alumina, alumina produced by the Bayer process, zirconia, and eutectic mixtures thereof.

As a method for shaping inorganic particles into spherical ones, it is possible to apply a method in which the above-described inorganic material in an indeterminate form is ground, and melted in a high-temperature oven at a temperature above the melting point thereof, thereby obtaining spherical particles by utilizing the surface tension; or a method in which the above-described inorganic material is melted at a high temperature above the melting point thereof, and the melt is sprayed to obtain spherical particles.

The microspheres useful in the present disclosure may be transparent, translucent, or opaque.

In another embodiment, the microspheres have a refractive index of less than 1.30, 1.40, 1.49, 1.50, 1.53, 1.55, 1.57, or even 1.60. The refractive index may be determined by the standard Becke line method.

The microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

In some embodiments, a useful range of average microsphere diameters is at least 10, 20, 25, 40, 50, 75, 100, or even 150 µm (micrometers); at most 200, 400, 500, 600, 800, 900, or even 1000 µm. The microspheres may have a unimodal or multi-modal (e.g., a bimodal) size distribution depending on the application.

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening.

Alternately, average diameter can be determined using any commonly known microscopic methods for sizing particles. For example, optical microscopy or scanning electron microscopy, and the like, can be used in combination with any image analysis software. For example, software commercially available as free ware under the trade designation "IMAGE J" from NIH, Bethesda, Md.

In one embodiment, the plurality of microspheres have a difference in size distribution not more than 40% (30% or even 20%) based on the average microsphere diameter.

Article

The articles of the present disclosure, comprise a plurality of microspheres, which are arranged in a monolayer (i.e., a single layer) on the surface of the bead bonding layer. The monolayer comprises at least one area substantially free of microspheres (referred to herein as first area) and at least one area comprising a plurality of microspheres (referred to herein as second area). The microspheres in the second area comprise a plurality of microspheres that are randomly-distributed and closely packed (i.e., generally there is not enough space between neighboring microspheres to place another microsphere). The first area is substantially free of microspheres meaning that the first area is free of microspheres or comprises an occasional microsphere(s) which is not in a predetermined place (i.e., is random). Thus, the density of microspheres (i.e., number of microspheres per defined unit area) in the first area is far less than the density of microspheres in the second area. For example, the first area comprises a microsphere density less than 20%, 10%, 5%, 1%, 0.5%, or even 0.1% of the microsphere density in the second area.

In one embodiment, the first area comprises a plurality of discrete areas, wherein each discrete area is at least 50, or even 75 micrometers and no larger than 150, 200, 250, or even 300 micrometers in dimension (e.g., diameter) and the plurality of discrete areas comprises an occasional microsphere.

When making the article using a barrier layer material as described below, random microspheres can be found in the first area due, for example, to pinhole defects. It is known that printing thin ink layers (such as the barrier layer material) is prone to pinhole defects. The defect shows up as a number of small areas where there is no ink coverage. Overall percentage of these open areas depends on the printing method, barrier material formulation, and thickness of the barrier layer material. Area of pinholes can be 0.5%, 1%, 5%, or up to 10% of the total targeted coverage area. Pinholes can be either distributed randomly or have certain directionality, usually in downweb directions. All printing methods, including but not limited to flexographic, gravure, screen, lithographic, letter-press, pad, and ink-jet, can have pinhole defects in printing areas. Because these defect areas do not comprise barrier material, microspheres may become attached. Depending, of course, on the size of the microsphere and the size of the first area, in one embodiment, the occasional microspheres in the first area may cover less than 20%, 15%, 10%, 5%, 3%, or even 1% of the total surface of the first area.

Figure 2A:
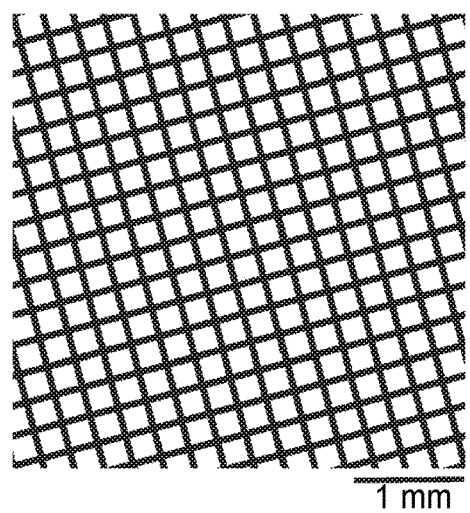
FIGS. 2A to 2C and 2F are patterns used to make the articles in the examples; insert pattern for Ex 7-9
Figure 2B:
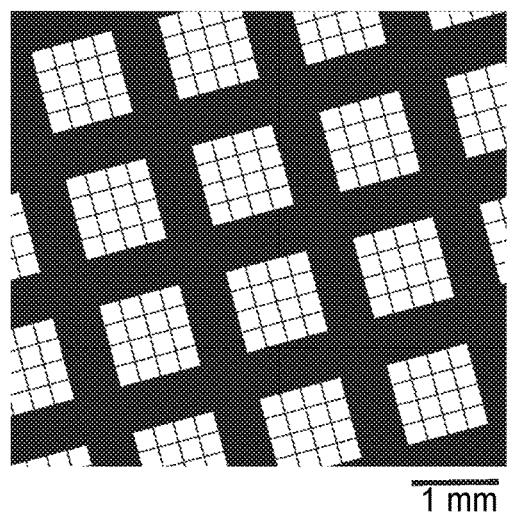

Shown in FIGS. 2A to 2B are patterns that were used to generate the examples disclosed herein. The white area is the area which will be printed with a barrier material, which will resist the microspheres from depositing and thus forming the first area in the resulting article. The black area is the area which will not be printed and thus, when coated with microspheres, the microspheres will randomly pack in these regions, forming the second area in the resulting article. Shown in FIG. 2F is another patterns that were used to generate the examples disclosed herein. In this pattern, the black area is the area which will be printed with barrier material and will resist microspheres from depositing, while the white area, when coated with microspheres, will have microspheres randomly pack this is area.

The resulting article will comprise a predetermined pattern, which are formed by a plurality of the first areas, a plurality of the second areas, or a plurality of both first and second areas. In one embodiment, the second area comprising a plurality of microspheres is discontinuous across the microsphere layer, while the first area substantially free of microspheres is continuous across the microsphere layer. In another embodiment, the first area substantially free of microspheres is discontinuous across the microsphere layer while the second area comprising a plurality of microspheres is continuous across the microsphere layer. In yet another embodiments, both the first and second areas are discontinuous across the microsphere layer as shown in FIG. 2D, which is a schematic top view of an article of the present disclosure. In FIG. 2D, the article comprises a plurality of first areas substantially free of microspheres, 25d, and a plurality of second areas, which comprise a plurality of randomly-distributed microspheres, 27d. FIG. 2E is a schematic top view of another article of the present disclosure, wherein the article comprises a plurality of first areas substantially free of microspheres, 25e, and a plurality of second area, which comprise a plurality of randomly-distributed microspheres, 27e. In FIG. 2E, both the first and second areas are not continuous across the entire microsphere layer, however they are continuous in one direction across the microsphere layer.

Figure 2C:
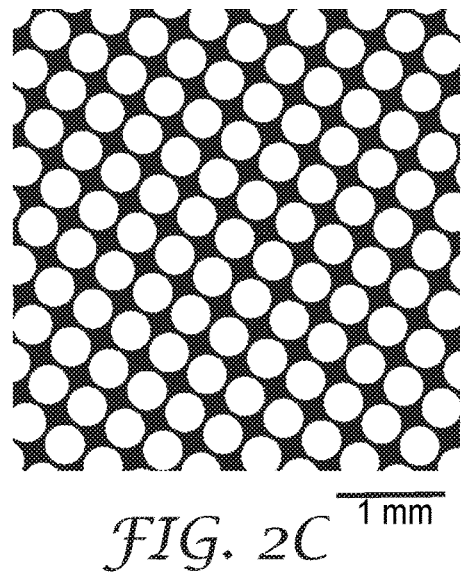
Figure 2D:
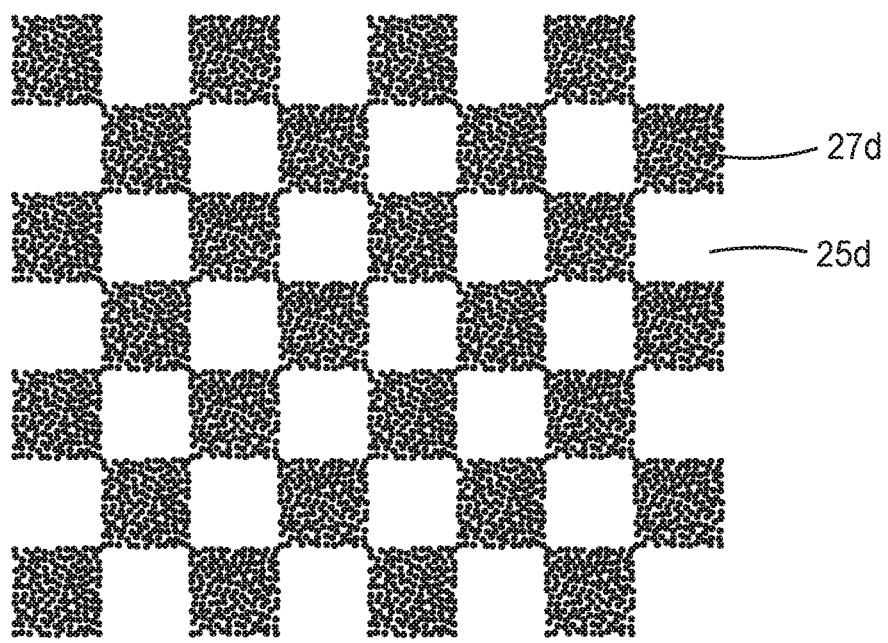
FIGS. 2. 2D and 2E are schematic representations of the top view of an article of the present disclosure comprising a predetermined pattern.
Figure 2E:
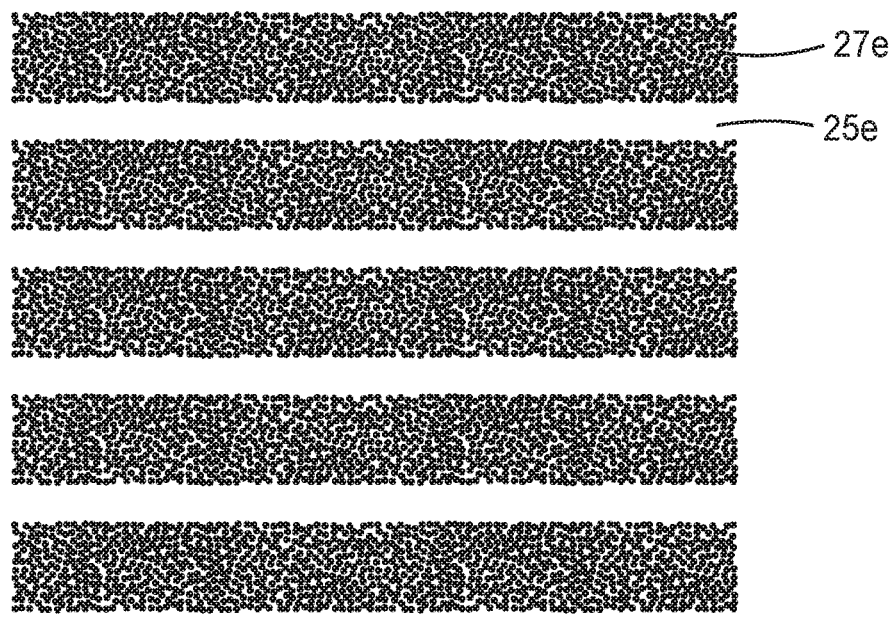
Figure 2F:
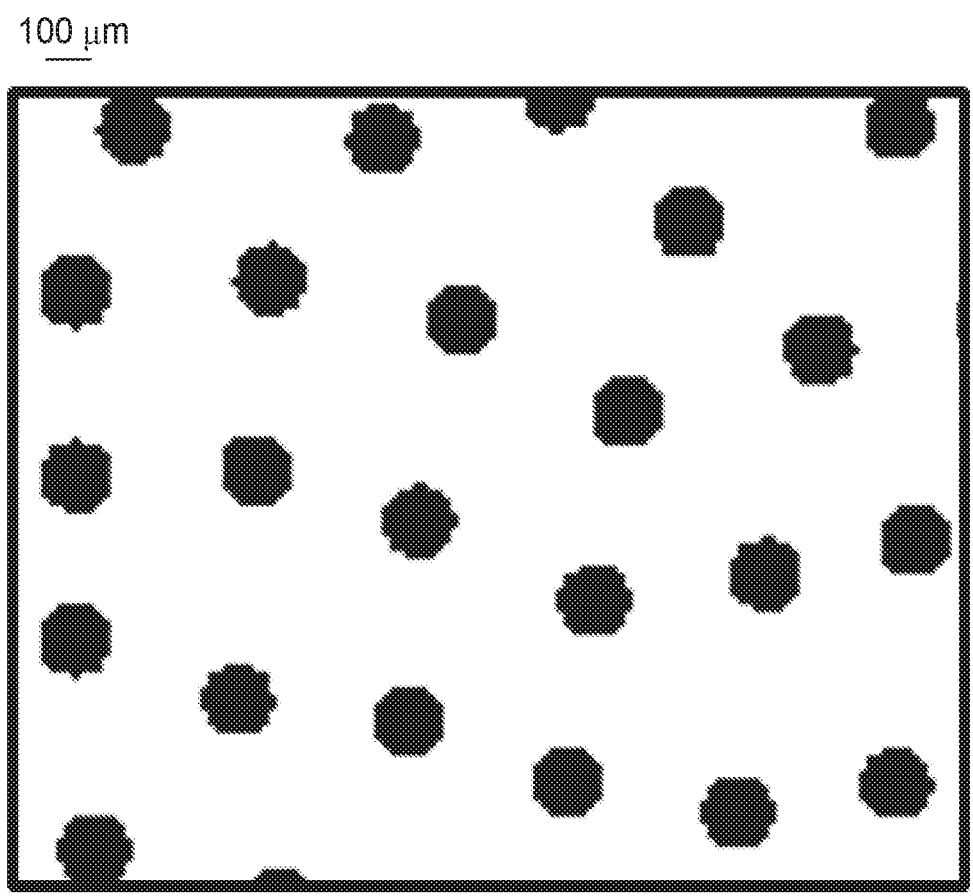
Figure 3A:
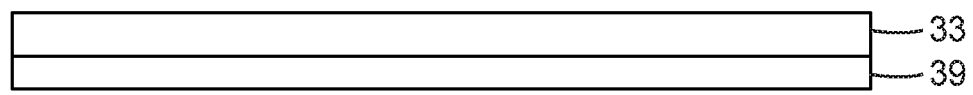
FIGS. 3A-3F show a method of making an article according to one embodiment of the present disclosure.
Figure 3B:
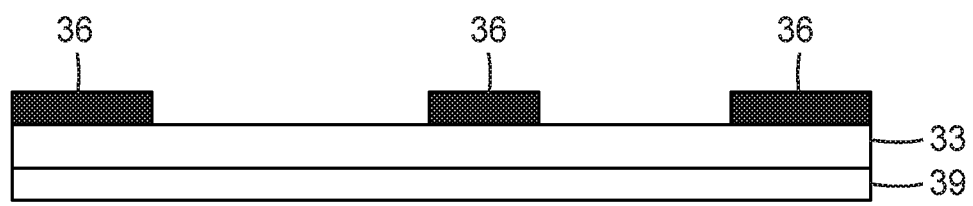
Figure 3C:
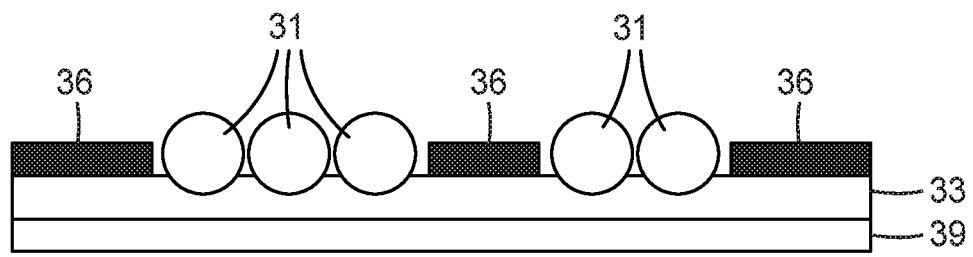
Figure 3D:
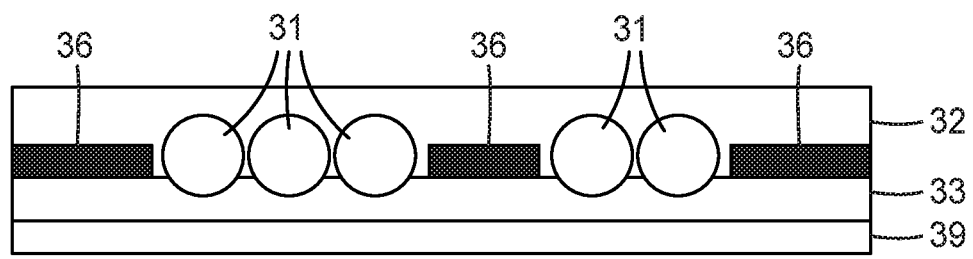
Figure 3E:
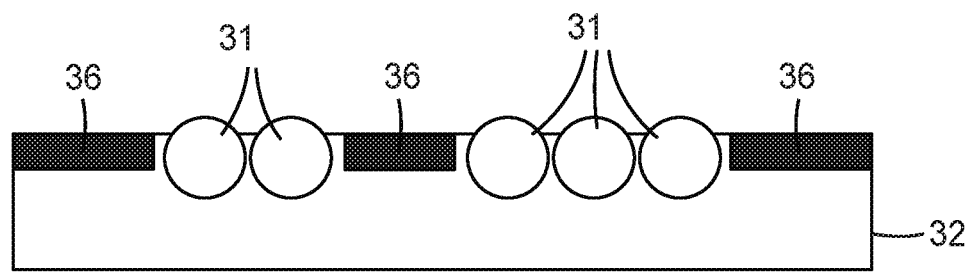
Figure 3F:
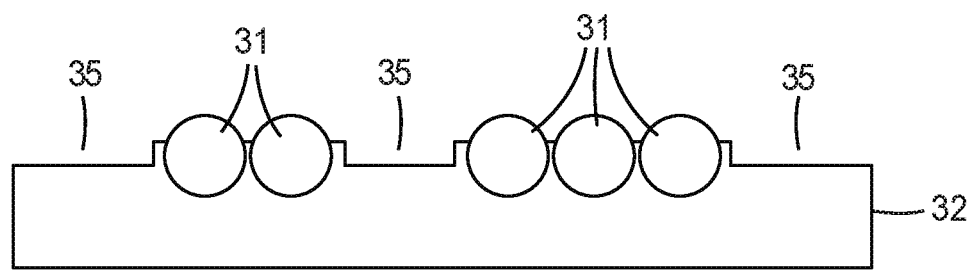

The first and second areas may comprise any shape, for example in FIGS. 2A and 2B, the patterned regions for the first areas (substantially free of beads) are square shaped, while in FIG. 2C, the first areas are circular in shape. Other shapes, such as triangular, rectangular, oblong, hexagonal, crescent, Triangular Square, Square Hexagonal, Hexagonal Elongated triangular, Elongated triangular, Trihexagonal tiling, Trihexagonal Snub square, Snub square Truncated square, Truncated square Truncated hexagonal, Truncated hexagonal, Rhombitrihexagonal tiling, Rhombitrihexagonal Snub hexagonal, Snub hexagonal Snub hexagonal, Snub hexagonal (mirrored) Truncated rhombitrihexagonal Truncated trihexagonal, irregular, etc. can be envisioned. As will be seen in some of the examples, the shape of the patterned area is not necessarily the identical shape in the resulting article due to microsphere shape and packing.

In one embodiment, the predetermined pattern may be psuedo-random, meaning that pattern may appear random but it is not. Psuedo-random patterns are typically less noticeable to the naked eye than a regular pattern. Also, if the article is used with a printed surface, a regular pattern may interact with a print, such as a Moire effect.

As mentioned above, the resulting article will comprise a predetermined pattern, which is formed by a plurality of the first areas, a plurality of the second areas, or a combination thereof. In one embodiment, it may be advantageous to use a high density pattern (i.e., high number of first and/or second areas per $cm^2$) such that the pattern is not visible to the naked eye; to assist in the physical characteristics of the article, such as maintaining durability compared to a continuous randomly-distributed microsphere layer; and/or to increase the optical clarity of the article. In one embodiment, the resulting article comprises at least 0.01, 0.1, 1, 10, 50, or even 100 areas/$cm^2$; and at most 1000, 2000, 5000, or even 10000 areas/$cm^2$ or even higher.

Depending on the dimensions of the second area, the microsphere diameter, and/or the size distribution of the microspheres, the second area comprising a plurality of microspheres may comprise at least 2, 4, 6, 8, 10, 20, 40, 80, 100, or even 500 microspheres.

In the articles of the present disclosure, the plurality of microspheres are partially embedded into the bead bonding layer, which means that the microspheres are embedded approximately at least 50%, 60%, or even 70% and no more than 80% of the microsphere diameter into the bead bonding layer, however, a portion of each of the microspheres projects outwardly from the surface of the bead bonding layer to provide among other things, durability, abrasion resistance, and/or a low coefficient of friction.

In the present disclosure, the plurality of microspheres cover more than 10, 15, 20, or even 25%; and less than 30, 40, 45, 50, 55, or even 60% of the surface of the bead bonding layer. Previously, it has been found that when beads were randomly applied to the surface at coverages less than 70%, the beads cluster either by random or by electrostatic attractions, leaving areas on the construction's surface void of beads. As shown in the examples, surface coverages of at least 35% and less than 70% can be achieved, while still retaining the durability characteristics of a continuously coated microsphere surface.

Additional Layers

In addition to the substrate, bead bonding layer, and microsphere layer previously mentioned, the resulting article of the present disclosure may also comprise additional layers to impart desirable characteristics into the article.

In one embodiment, a nanoparticle-containing undercoat may be applied between the microsphere layer and the bead bonding layer to provide anti-soiling properties as taught in U.S. Pat. Publ. No. 2015-0343502 (Clark et al.), incorporated herein by reference.

In one embodiment, a reinforcing layer is disposed on the surface of the bead bonding layer, opposite the microsphere layer. The reinforcing layer can be used to provide advantageous handling characteristics, and in doing so, permit the use of a thinner bead bonding layer. Examples of suitable reinforcing layers include polyurethanes resin systems, acrylic resin, polyester resins, and epoxy resins. Suitable polyurethane resin systems include, but are not limited to, those selected from at least one of: polyurethane dispersions, 2 part urethanes coated from solvent, and 100% solids 2 part urethanes. Suitable acrylic resin systems include, but are not limited to, those selected from UV-curable acrylic resin systems and thermally curable acrylic resin systems. Such systems may be solvent coated, aqueous dispersions, or hot melt coated. One suitable type of polyester resin is co-amorphous polyester resins. Suitable epoxy resin systems include, but are not limited to, those selected from at least one of two part and one part epoxy resins.

In one embodiment, the article is thermoformable or stretchable. Thus, it may be advantageous to include layers that can bear the elongation that occurs during forming or stretching without failing, cracking, or generating other defects. This can be achieved by using materials that have a temperature at which they undergo melt flow and forming near that temperature. In some cases, crosslinked materials that do not flow can be used, but they are more likely to crack during the elongation. To avoid this cracking, in one embodiment, the crosslink density should be kept low, as can be indicated by a low storage modulus in the rubbery plateau region. In addition, it is preferred to do the forming at relatively low temperatures, since as temperatures increase above the glass transition temperature of crosslinked materials, their capacity for elongation begins to decrease. In some embodiments, the article includes an additional layer which has good capacity for elongation and prevents elastic recovery of the bead bonding and/or substrate layer. In one embodiment, this additional layer, disposed between the bead bonding layer and the substrate is a material having a glass transition temperature greater than or equal to 60° C. and less than or equal to 150° C., such a material includes an amorphous polyester such as a non-crystalline PET (e.g., amorphous PET, PETG, or polycarbonate).

In one embodiment, the bead bonding layer can optionally perform the function of acting as the adhesive for a desired substrate and/or further comprise pigment(s) such that it also has a graphic function.

The bead bonding layer, when selected to function also as a substrate adhesive graphic image, may be, for example, pigmented and provided in the form of an image, such as, for example, by screen printing the bead bonding layer in the form of a graphic for transfer to a separate substrate. However, the bead bonding layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the bead bonding layer opposite the microsphere layer by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

Method of Making

In one embodiment, the articles disclosed herein may be made via a transfer process wherein the layer of microspheres is patterned and held in a transfer polymer which is then used to transfer the layer of patterned microspheres onto the bead bonding layer.

The transfer carrier of the present disclosure comprises a monolayer of patterned microspheres which are attached, in some embodiments partially embedded, in a transfer polymer.

Figure 5:
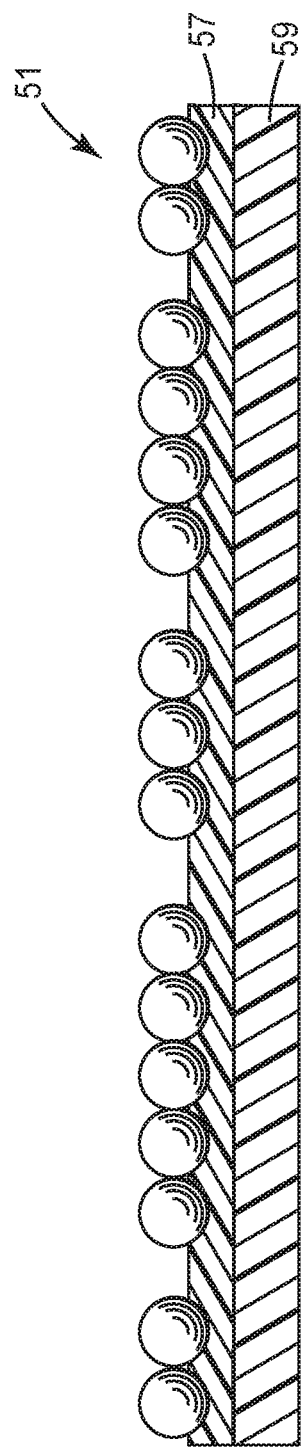
FIG. 5 is a cross-sectional view of a transfer carrier according to one embodiment of the present disclosure.

The transfer carrier comprises a support layer and a transfer polymer layer. Shown in FIG. 5 is transfer carrier 51, which is in its simplest form, comprising support layer 59, transfer polymer layer 57 bonded thereto, and a plurality of microspheres. As will be described below, the microspheres are first embedded into the transfer polymer layer of the transfer carrier. Because the transfer polymer layer generally has a tacky nature, the transfer polymer layer is typically contacted onto a support layer to provide physical support.

The support layer should be "dimensionally stable". In other words it should not shrink, expand, phase change, etc. during the preparation of the transfer carrier. Useful support layers may be thermoplastic, non-thermoplastic or thermosetting, for example. One skilled in the art would be able to select a useful film for the transfer carrier of the present disclosure. If the support layer is a thermoplastic film it should preferably have a melting point above that of the polymer used in the bead bonding layer. Useful temporary support layers for forming the transfer carrier include, but are not limited to those selected from the group consisting of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like.

Useful materials for forming the transfer polymer layer include, but are not limited to, thermoplastics such as those selected from the group consisting of polyolefins such as polyethylene, polypropylene, organic waxes, blends thereof, and the like.

The thickness of the transfer polymer layer is chosen according to the microsphere diameter distribution. According to the present disclosure, the microsphere embedment becomes approximately the mirror image of the transfer carrier embedment. For example, a microsphere which is embedded to about 30% of its diameter in the transfer polymer layer is typically embedded to about 70% of its diameter in the bead bonding layer.

In order to partially embed the microspheres in the transfer polymer layer, the transfer polymer layer should preferably be in a tacky state (either inherently tacky and/or by heating). The microspheres may be partially embedded, for example, by applying a layer of microspheres on the transfer polymer layer followed by one of (1)-(3): (1) heating the transfer carrier, (2) applying pressure to the plurality of microspheres on the transfer carrier (with, for example, a roller) or (3) heating and applying pressure to the plurality of microspheres on the transfer carrier.

For a given transfer polymer layer, the microsphere embedment process is controlled primarily by temperature, time of heating and thickness of the transfer polymer layer. The interface of the transfer polymer layer with the temporary support layer becomes an embedment bonding surface since the microspheres will sink until they are stopped by the dimensionally stable temporary support layer.

The thickness of the transfer polymer layer should be chosen to prevent encapsulation of most of the smaller diameter microspheres so that they will not be pulled away from the bead bonding layer when the transfer polymer layer is removed. On the other hand, the transfer polymer layer must be thick enough so that the larger microspheres in the microsphere layer are sufficiently embedded to prevent their loss during subsequent processing operations.

Patterning the Microspheres

The articles of the present disclosure can be made by depositing a layer of barrier material in a predetermined pattern on the transfer polymer layer. The barrier material is a material that resists the microspheres from attaching to the transfer polymer layer, wherein the microspheres would otherwise mount to the transfer polymer layer if the barrier material was not present. The surface is then coated with an excess of microspheres to ensure closely packed microspheres in the areas not covered by the barrier material.

Examples of how the articles of the present disclosure are made are provided in FIG. 3, which shows the preparation of a decorative article via a transfer process using a transfer carrier. FIGS. 3A through 3C depict the steps of making a transfer carrier of one embodiment of an article of this disclosure. FIG. 3A depicts a polymeric carrier having a transfer polymer layer 33 and a support layer 39. FIG. 3B further depicts a barrier layer material 36 covering portions of transfer polymer layer 33. FIG. 3C further depicts microspheres 31 partially embedded in transfer polymer layer 33 between barrier layer material 36. The transfer carrier is then contacted with a bead bonding layer to transfer the plurality of microspheres. In FIG. 3D, bead bonding layer 32 covers barrier layer material 36 and microspheres 31. FIG. 3E depicts a decorative article after the transfer polymer layer and support layer have been removed. FIG. 3F depicts an embodiment in which barrier layer material 36 is transient, but remains with the article, e.g., until the first washing, thereby creating cavities 35 where barrier layer material used to be located.

Figure 4A:
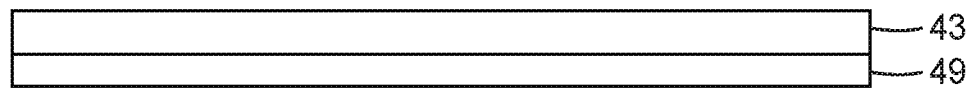
FIGS. 4A-4F show a method of making an article according to another embodiment of the present disclosure.
Figure 4B:
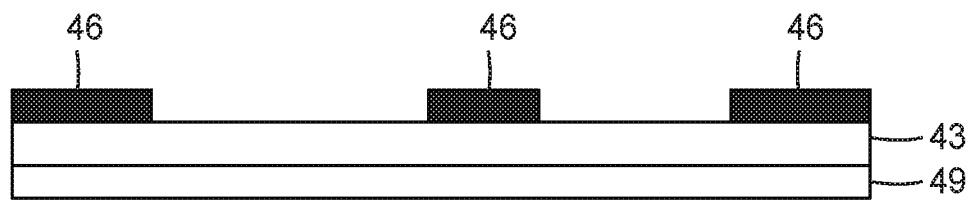
Figure 4C:
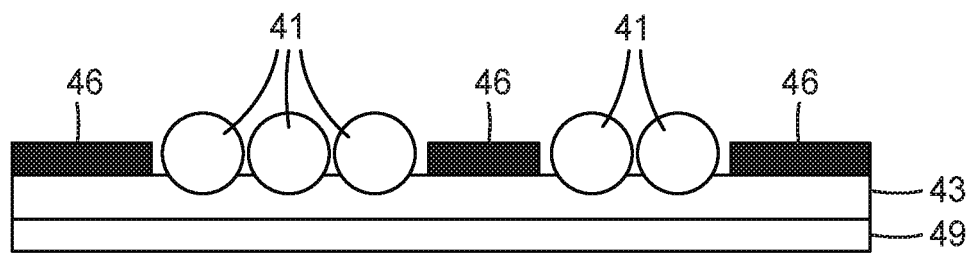
Figure 4D:
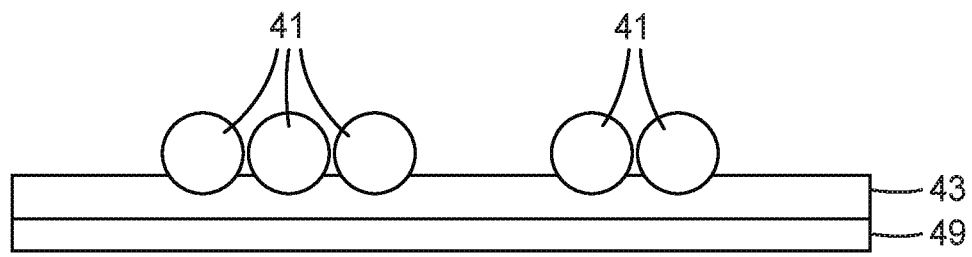
Figure 4E:
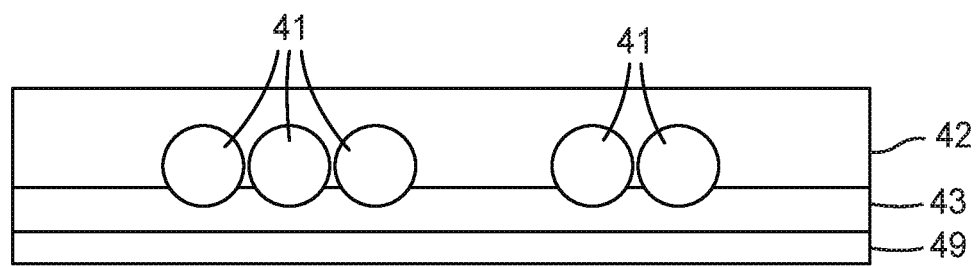
Figure 4F:
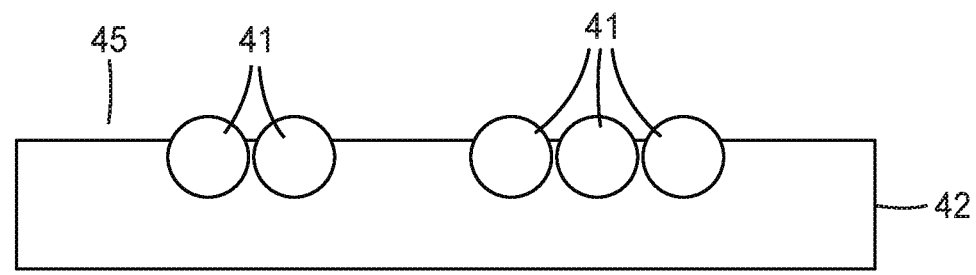

FIGS. 4A through 4F depict an alternate embodiment in which the barrier layer material is removed after the microspheres are applied to the transfer carrier. FIG. 4A depicts a transfer carrier having a transfer polymer layer 43 and a support layer 49. FIG. 4B further depicts a barrier layer material 46 covering portions of the transfer polymer layer 43. FIG. 4C further depicts microspheres 41 partially embedded in transfer polymer layer 43 between barrier layer material 46. FIG. 4D further depicts the removal of barrier layer material 46. FIG. 4E further depicts bead bonding layer 42 covering portions of transfer polymer layer 42 and microspheres 41. FIG. 4F depicts the article after the transfer polymer layer and support have been removed.

A patterned barrier layer material is deposited on the surface of the transfer polymer layer. The barrier layer may be deposited by any suitable method. Printing is typically the most preferred method. However, any discontinuous deposition method (e.g. needle die coating of stripes) can be used. A number of printing methods can be used to deposit the barrier layer, including contact printing, e.g. flexographic printing, gravure printing, ink jet printing, and screen printing.

In some embodiments, the barrier layer material is permanent and remains substantially intact and attached to the bead bonding layer (in the unbeaded areas) in the finished article. In other embodiments, the barrier layer material is quasi-permanent and interfuses with the bead bonding layer (at least in the unbeaded areas) when the bead bonding layer is applied; thereby remaining, in a modified form, in the finished article. In yet other embodiments, the barrier layer material is transient and is absent from, or removable from, the finished decorative article. A transient barrier layer may be removed prior to depositing the bead bonding layer. Alternatively, it may be removed from the finished article.

The barrier layer material may be any suitable thickness as long as it prevents the transfer polymer layer from contacting the microspheres. For example, in some embodiments the barrier layer material may be a surface monolayer, in some embodiments it may be about 10 nm to about 100 um thick, and in other embodiments it may have different thicknesses.

The barrier layer material is desirably a material that is physically and chemically "inert" with respect to the microspheres. In other words, it does not react with the microspheres, e.g., does not attract or attach to the microspheres or allow the microspheres to embed. Accordingly, the microspheres are typically unable to embed in the barrier layer or the portion of the transfer polymer layer covered by the barrier layer. Preferably the barrier layer material does not soften when heat is applied to the transfer polymer layer, which heat is applied to allow the microspheres to contact and/or embed in the transfer polymer layer. This physical "inertness" of the barrier layer material may be achieved by, e.g., selecting materials that have a much higher softening temperature than the transfer polymer layer material and/or loading the barrier layer material with particles or other additives that increase its "inertness." The addition of particles, pigments, and crosslinkers may increase the barrier layer's physical inertness. Chemical "inertness" of the barrier layer material may be achieved, e.g., with additives such as a slipping agent or a wax that prevent adhesion of the microspheres such as by providing a steric barrier of an adhesively-inert layer on the surface of the barrier layer.

The barrier layer material may be clear. If the barrier layer material is clear, it will allow the color of the underlying substrate (in the finished article) to show through. If the barrier layer material is colored, it may be the same or different color as the underlying substrate (in the finished article). A permanent or quasi-permanent barrier layer material can be the same color as the substrate layer to intensify the color of the finished article.

An ink may be used to form the barrier layer. "Ink" refers to a composition that is deposited as a liquid on a surface and solidifies to form a pre-determined pattern. The inks used to form barrier layer materials may be clear or colored. Suitable materials for a clear ink include wax, polyvinyl alcohol, polyurethane, polyacrylate, polysiloxane, latex, or any other material suitable as an ink. If the ink is colored, it may contain dyes or pigments, including nanopigments. Suitable materials for a colored ink include the same materials as for a clear ink with the addition of a colorant. Suitable colorants for the ink include the same colorants, e.g., dyes and pigments (including nanopigments) that are used in the bead bond layer. Different additives can be used to improve ink stability, printability and/or the barrier "inert" function of the ink, such as surfactants, defoamers, pigments, inorganic particles or clusters such as silicate, calcium carbonate, clay, metal, metal oxide or other materials, and organic particles such as polysiloxane beads, polystyrene beads, PMMA beads and other materials.

Materials that may be used to form a permanent barrier layer include waxes, resins, polymeric materials, inks, inorganics, UV-curable polymers, and particles composed of either organic or inorganic metallic or non-metallic materials.

Materials that may be used to form a quasi-permanent barrier layer material include any composition or material that will interfuse with the bead bonding layer during the coating process of the bead bonding layer. For example, if the bead bonding layer solution is water-borne, any barrier material that is water soluble will be suitable, such as a barrier material comprising polyvinyl alcohol.

Materials that may be used to form a transient barrier layer material that is absent from the final article include those that can be chemically or physically dissolved and washed away, such as a photoresist. If the transient barrier layer is removed by a solvent after the microspheres are embedded in the transfer polymer layer, but before the bead bonding layer is applied, any suitable solvent that does not affect the microspheres or transfer polymer layer can be used. If the transient barrier layer is removed by a solvent after the bead bonding layer (and other layers) are added, the solvent may be any suitable solvent that does not affect any of the exposed layers. For example, the barrier layer may be removed during washing of the decorative article. Alternatively, the transient barrier layer material may be any material that has higher adhesion to the transfer polymer layer than to the final decorative article, and thus remains with the transfer polymer layer when it is separated from the decorative article.

The barrier layer material may be applied in any suitable pattern or shape, including regular and irregular shapes, linear and curved shapes, continuous and discontinuous patterns, random and repeating patterns, and combinations thereof. The places containing barrier layer material may be large or small. The larger the areas of barrier layer material, the fewer the number of microspheres in the resulting monolayer of microspheres.

In some embodiments, the pre-determined patterns of the areas of randomly distributed microspheres and/or areas substantially free of microspheres may have repeating features such as lines, dots, squares, circles, chevrons, or any regular and irregular shapes, with the feature size and the spacing between features being determined according to the desired visual effect. In some embodiments, it is desirable to make the feature size and/or the spacing between features small enough so that the pre-determined patterns are not visible to the naked eye, e.g., the distinction between the beaded and unbeaded areas are not discernible when viewing by eye.

The patterned microspheres may then be contacted with a bead bonding layer or a temporary support, such as an adhesive or a transfer polymer layer, which temporarily retains the plurality of microspheres in its predetermined pattern until they can be transferred to a bead bonding layer.

Figure 9A:
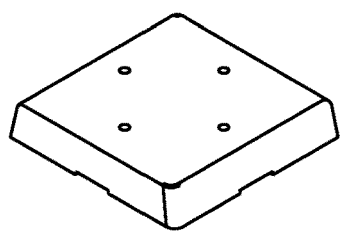
FIG. 9A is a front perspective view of one embodiment of a thermoformed article according to the present disclosure.
Figure 9B:
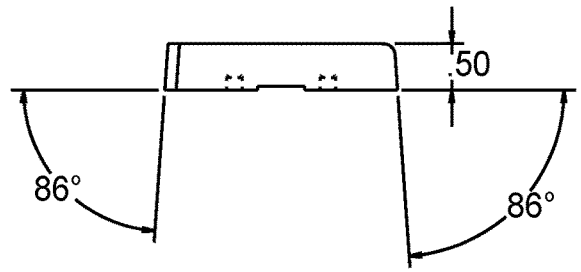
FIG. 9B is a side cross section view of one embodiment of a thermoformed article according to the present disclosure.
Figure 9C:
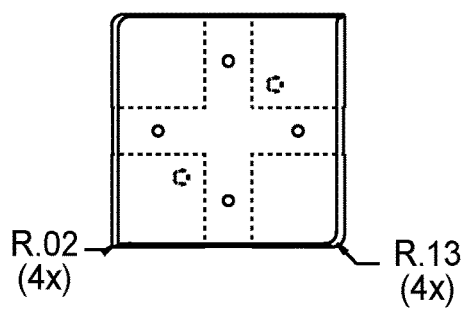
FIG. 9C is a top plan view of one embodiment of a thermoformed article according to the present disclosure.
Figure 9D:
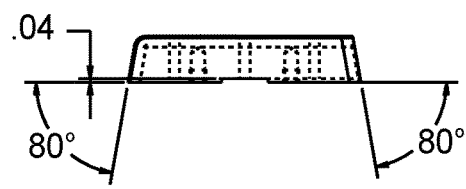
FIG. 9D is a side cross section view of one embodiment of a thermoformed article according to the present disclosure.
Figure 9E:
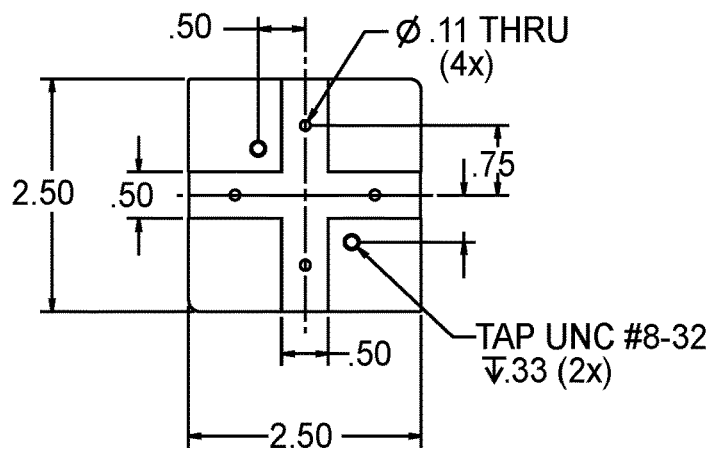
FIG. 9E is a top plan view of one embodiment of a thermoformed article according to the present disclosure (units (not shown) in FIG. 9 are in inches)

Some of the articles made according to the present disclosure are preferably thermoformable articles, which as used herein, refers to articles that can be shaped via heat and pressure to form a three-dimensional shape. In one embodiment, the article of the present disclosure has an elongation percent at failure of greater than 26%, 40% 50%. In some embodiments, these articles are thermoset articles, which means that the material is highly crosslinked and is unable to be further melt processed. The present disclosure contemplates thermoformable and/or thermoset articles useful across a range of shapes, sizes, and configurations. In some embodiments, the thermoformable and/or thermoset articles are substantially flat. In the course of thermoforming, some articles may be deformed and permanently strained or stretched. In some embodiments, the thermoformable and/or thermoset articles are 3 dimensional, such as, for example, a five side box as depicted in FIG. 9A. In some embodiments, the corners or edges can have sharp angles, such as 90 degree angles or higher. Without wishing to be bound by theory, it is believed that the strain on the materials used to make these types of 3 dimensional articles can vary depending on the shape and dimensions of the article. For example, a 3 dimensional article made using the form as shown in FIG. 9A has a 40 to 50% strain at the base of the five sided box. In some embodiments useful in the present disclosure, the thermoformable and/or thermoset articles have more gradual contours, such as, for example, sloped or curved edges. Without wishing to be bound by theory, it is believed that the strain on these more gradual contoured 3 dimensional articles is lower than the aforementioned 3 dimensional articles. For example, strains in the range of 10 to 20% strain may be observed in articles having more gradual contours.

The other criterion for the article to be thermoformable is that it can bear the elongation that occurs during forming or stretching without failing, cracking, or generating other defects. This can be achieved by using materials that have a temperature at which they undergo melt flow and conducting the forming step near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, it is preferred to do the forming at relatively low temperatures, since as temperatures increase above the glass transition temperature of crosslinked materials, their capacity for elongation begins to decrease.

Thermoformable materials suitable for use in articles of the present disclosure include polycarbonate, polyurethanes such as thermoplastic polyurethanes, and polyesters including amorphous or semi-crystalline polyesters such as polyethylene terephthalate.

In other embodiments, the bead bonding layer is a highly crosslinked material, which initially is not crosslinked or is very lightly cross-linked, then after thermoforming and (further) cured (e.g., post cured) to generate a resin having a high crosslink density.

Lightly crosslinked materials produce less elastic recovery energy after being deformed in the forming process as compared to highly crosslinked materials. Also, lightly crosslinked materials tend to accommodate higher degrees of elongation before failing compared to highly crosslinked materials. In some embodiments, non-crosslinked materials are preferred to give very high degrees of elongation and to withstand deformation at very high temperatures without failing. In some embodiments, lightly crosslinked materials are preferred over non-crosslinked materials to give better resistance to chemicals as well as resistance to creep and other dimensional instability over time.

The bead bonding layer may be treated by ultraviolet or e-beam to provide crosslinking of the bead bonding layer. Such crosslinking may improve the resistance of the bead bonding layer to organic solvents. Such radiation treatment may be done to either, or both, major surfaces of the bead bonding layer. In addition, it may or may not be done through intervening layers. The surface of the bead bonding layer opposite that of the microsphere-containing transfer polymer layer may be treated to provide improved bonding to the various other layers described herein. Such treatments include, but are not limited to, corona treatment, plasma treatment, chemical etching, and the like.

Figure 6A:
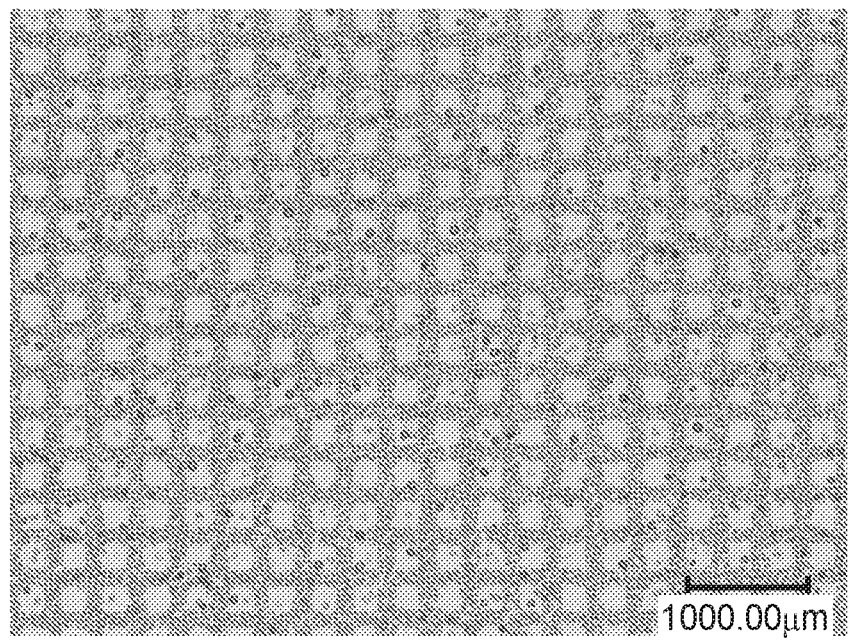
FIGS. 6A and 6B are optical micrographs of Example 1.
Figure 6B:
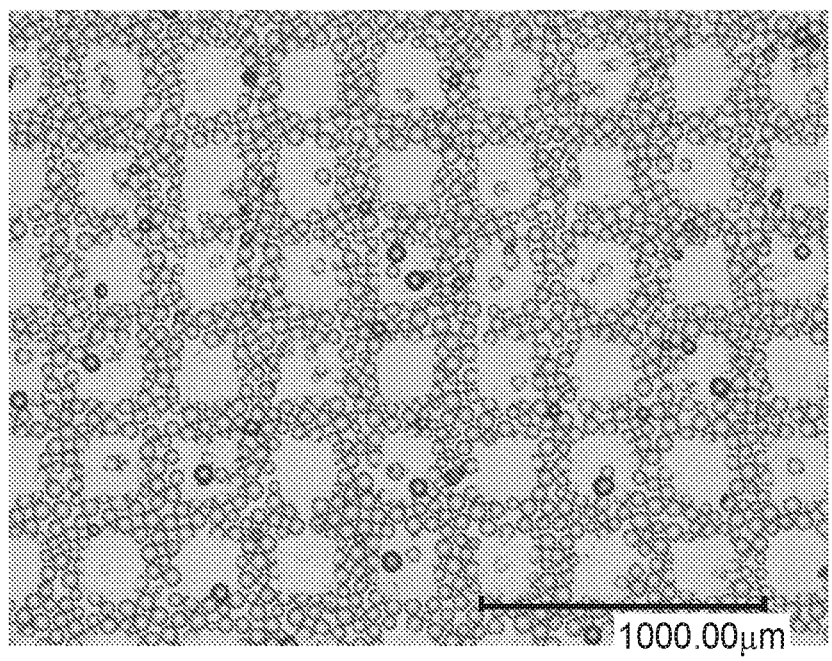
Figure 8A:
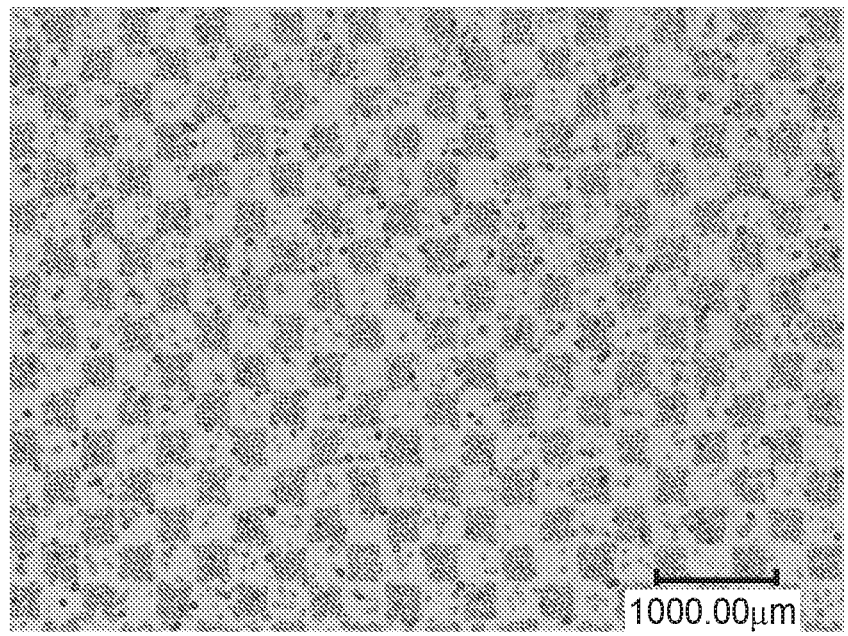
FIGS. 8A and 8B are optical micrographs of Example 3.
Figure 8B:
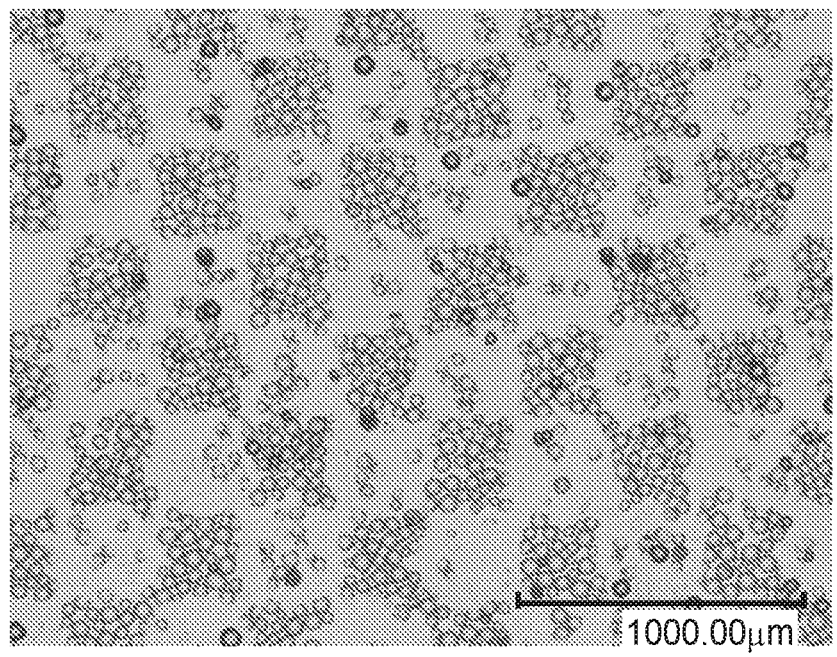

As described above, articles, transfer carriers and methods of making them have been disclosed herein. Compared to articles comprising a continuous monolayer of microspheres, the articles of the present disclosure have a patterned monolayer of randomly distributed microspheres as shown in FIGS. 6B and 8B. Less surface coverage of the plurality of microspheres can allow for cost reductions (e.g., less microspheres used per article, and/or article weighs less). The patterning of microspheres allows for the entire microsphere coated surface of the article to have durability due to the protection afforded by the microspheres. The absence of particles in portions of the article can enable benefits such as improvements in the through clarity and/or haze of the decorative article; and/or ease in cleaning while maintaining the durability of the article.

In one embodiment, the article of the present disclosure is durable, meaning that it has abrasion and/or scratch resistance. Abrasion resistance, can be measured using a rotary Taber abraser and visually inspecting the samples for damage. In one embodiment, the decorative articles of the present disclosure have an abrasion resistance of no more than 10, 5, or even 3.5. The scratch resistance can be measured by pencil hardness. In other words, at which hardness the pencil scratches the surface. In one embodiment, the decorative articles of the present disclosure have a pencil hardness value of at least 6H, 8H, or even 10H at a force of 2.5 Newtons. In one embodiment, the articles of the present disclosure have a pencil hardness value of at least 3H, 5H, 6H, 8H, 9H, or even 10H at a force of 7.5 Newtons.

In one embodiment, there is a relationship between pencil hardness of the resulting article and the storage modulus of bead bond layer as measured by DMA (dynamic mechanical analysis) using articles comprising a monolayer of microspheres and the bead bonding layer. In one embodiment, free standing films (i.e., no substrate present) can be evaluated for their storage modulus (E') at room temperature and glass transition temperature ($T_g$). These properties can be measured using a dynamic mechanical analyzer (such Model Q800 DMA, TA Instruments, New Castle, Del.) with a tensile grip separation distance of between 14.9 millimeters and 21.0 millimeters (0.59 to 0.83 inches), and a temperature ramp rate of 2.5° C./minute. Samples can be analyzed with a frequency of 1.0 Hz through a temperature sweep starting at −50° C. (−58° F.) up to 200° C. (392° F.) or until they yielded or broke.

In one embodiment, the storage modulus of the resulting article (e.g., monolayer of microspheres and bead bond layer) was at least 150 MPa, 500 MPa, or even 1000 MPa or greater.

The article of the present disclosure have a coefficient of friction of less than 0.3 or even 0.2. The coefficient of friction can be measured by the Method for Coefficient of Friction Testing disclosed herein.

In one embodiment, the articles of the present disclosure permit better visibility of an object (e.g., an image) located on the backside of the decorative articles, i.e., behind the microsphere layer and the bead bonding layer.

In one embodiment, the articles of the present disclosure have improved optical quality as compared to an identical article comprising a continuous layer of microspheres. These optical qualities can be quantitated in terms of transmission, haze, and clarity. Transmission is the amount of visible light that passes through the sample and reaches the detector. Light that is absorbed, scattered or reflected is not transmitted. Scattering can occur due to rough surfaces or refractive index mismatches in the film. In one embodiment, the articles of the present disclosure transmit at least 75, 80, 85, 90, or even 95% of the incident light. Of the light transmitted through the sample, haze refers to the percentage of light that deviates more than 2.5 degrees from the incident beam. Haze is a measure of the wide angle scattering and results in a reduction in contrast. In one embodiment, the articles of the present disclosure have a haze of less than 90, 85 or even 80%. Clarity refers to transmitted light that deviates less than 2.5 degrees from the incident beam. Clarity is a measure of narrow angle scattering and relates to the resolution of detail of objects viewed through a sample. Clarity is a distance-dependent attribute, for example, decreasing as the distance between sample and object increases. In one embodiment, the sample is placed next to an illumination source and a sensor (comprising a center sensor and a ring sensor) is placed at a given distance from the illumination source. Clarity can be defined as $$100\% \cdot \frac{I_C - I_R}{I_C + I_R}$$

where $I_C$ is the intensity at the center sensor and $I_R$ is light intensity at the ring sensor. No clarity (or 0%) would be equal intensity at the center and ring sensor, and 100% clarity would be zero intensity at the ring sensor (i.e. no light diverted less than 2.5 degrees from the incident light beam). In one embodiment, the articles of the present disclosure have a clarity of greater than 20, 25, 30, 40, or even 50% using the method disclosed in the example section.

In one embodiment, the articles of the present disclosure do not show finger prints.

In one embodiment, the article of the present disclosure exhibits a stain resistance to yellow mustard at elevated temperature and humidity as measured by the change in b* of less than 50. The products to which the articles of the present disclosure may be applied are often exposed to elevated temperatures and humidity. While many materials may provide adequate stain resistance at ambient conditions they often fail to provide sufficient stain resistance when exposed to more demanding environments for prolonged times, such as at 66° C. (150° F.) and 85% relative humidity for 24 hours and 72 hours; 60° C. and 90% relative humidity for 24 hours; or 65° C. and 80% relative humidity for 72 hours.

As noted in the examples below, microsphere laminates and thermoformed microsphere laminates have been prepared with patterns that are in some cases not visible to the naked eye and that have high pencil hardness in spite of reduced microsphere (bead) coverage.

Exemplary embodiments of the present disclosure include, but are not limited to the following.

Embodiment 1

An article comprising:
(a) a microsphere layer comprising a monolayer of microspheres, the monolayer of microspheres comprising a first area substantially free of microspheres and a second area comprising a plurality of randomly-distributed microspheres, wherein the monolayer of microspheres comprises a predetermined pattern, the predetermined pattern comprises at least one of (i) a plurality of the first areas, (ii) a plurality of the second areas, and (iii) combinations thereof; and
(b) a bead bonding layer disposed on the microsphere layer, wherein the plurality of microspheres are partially embedded in a first major surface of the bead bonding layer, wherein the article has a retroreflectivity ($R_a$) of less than 5.0 candelas/lux/square meter.

Embodiment 2

The article of embodiment 1, wherein the bonding layer comprises at least one of (i) a resin comprising a fluorine-containing polymer, (ii) a linear resin, (iii) a resin having low crosslink densities, (iv) a resin having high crosslink densities, and (v) combinations and blends thereof Embodiment 3

The article of any one of the previous embodiments, wherein the first area is continuous across the article and second area is discontinuous.

Embodiment 4

The article of embodiment 3, wherein the second area is continuous across the article and first area is discontinuous.

Embodiment 5

The article of any one of the previous embodiments, wherein the density of microspheres in the first area is less than 20% of the density of microspheres in the second area.

Embodiment 6

The article of any one of the previous embodiments, wherein the refractive index of the microspheres is less than 1.6.

Embodiment 7

The article of any one of the previous embodiments, wherein the microspheres have a sphericity of at least 80%.

Embodiment 8

The article of any one of the previous embodiments, wherein the microspheres have a size difference of no more than 40%.

Embodiment 9

The article of any one of the previous embodiments, wherein the microspheres covers more than 20% and less than 60% of the surface of the bead bonding layer.

Embodiment 10

The article of any one of the previous embodiments, wherein the microspheres are transparent.

Embodiment 11

The article of any one of the previous embodiments, wherein the microspheres have an average diameter of 20 to 200 micrometers.

Embodiment 12

The article of any one of embodiments 2-11, wherein the fluorine-containing polymer is selected from at least one of the following: fluoroolefins, fluorourethanes, and combinations thereof.

Embodiment 13

The article of any one of embodiments 2-12, wherein the fluorine-containing polymer is derived from aqueous dispersions selected from at least one partially fluorinated monomer, at least one non-fluorinated monomer, and combinations thereof.

Embodiment 14

The article of any one of embodiments 2-13, wherein the fluorine content along the polymeric backbone of the fluorine-containing polymer is from about 15% to 72% by weight.

Embodiment 15

The article of any one of embodiments 2-14, wherein the fluorine-containing polymer is a copolymer derived from tetrafluoroethylene, hexafluoropropylene, and vinylidene fluoride.

Embodiment 16

The article of any one of the previous embodiments, wherein the article further comprises a reinforcing layer formed on a second major surface of the bead bonding layer opposite the microsphere layer.

Embodiment 17

The article of embodiment 16 wherein the reinforcing layer is selected from one of the following: polyurethane resins, acrylic resins, polyester resins, epoxy resins, and mixtures thereof.

Embodiment 18

The article of embodiment 17, wherein the polyurethane resin is selected from polyurethane dispersions, two part urethanes coated from solvent, 100% solids two part urethanes, and combinations thereof.

Embodiment 19

The article of any one of embodiments 2-18, wherein the resin having low cross link densities are those resins comprising lightly crosslinked material having a molecular weight per crosslink point of greater than about 2,800 g/mol.

Embodiment 20

The article of any one embodiments 2-19, wherein the linear resin comprise at least one of the following linear materials: polyurethanes, polyureas, polyurethane ureas, polypolyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, and combinations thereof.

Embodiment 21

The article of any one of the previous embodiments, wherein the bead bonding layer comprises a polymer having a glass transition temperature greater than or equal to 60° C. and less than or equal to 150° C.

Embodiment 22

The article of any one of the previous embodiments, wherein the article comprises a barrier layer material disposed on the first major surface of the bead bonding layer located primarily in the first area.

Embodiment 23

The article of any one of the previous embodiments, wherein the microspheres within the second area are closely packed.

Embodiment 24

The article of any one of the previous embodiments, wherein the second area comprises at least three microspheres.

Embodiment 25

The article of any one of the previous embodiments, wherein the second area comprises no more than 50 microspheres.

Embodiment 26

The article of any one of the previous embodiments, further comprising a substrate, wherein the bead bonding layer is disposed between the substrate and the microsphere layer.

Embodiment 27

The article of embodiment 26, wherein the substrate comprises at least one of a metal, fabric, polymer, paper, and combinations thereof.

Embodiment 28

The article of any one of the previous embodiments, wherein the article has a pencil hardness of at least 9H at 7.5 Newtons.

Embodiment 29

The article of any one of the previous embodiments, wherein the article exhibits a stain resistance to yellow mustard when held at 65° C. and 80% relative humidity for 72 hours as measured by the change in b* of less than 50.

Embodiment 30

The article of any one of the previous embodiments, wherein the article is transparent.

Embodiment 31

The article of any one of the previous embodiments, wherein the article has a clarity of greater than 20%.

Embodiment 32

The article of any one of the previous embodiments, wherein the article has a storage modulus at least 150 MPa.

Embodiment 33

The article of any one of the previous embodiments, wherein the plurality of microspheres is embedded at 60-70% of the average microsphere diameter.

Embodiment 34

The article of any one of the previous embodiments, wherein the article is thermoformable.

Embodiment 35

The article of any one of the previous embodiments, wherein the article is thermally cured.

Embodiment 36

A thermoset article derived from the thermoformable article of embodiment 34.

Embodiment 37

The thermoset article of embodiment 36 is a 3-dimensional shaped thermoset article.

Embodiment 38

The thermoset article of embodiment 36 or 37 wherein curing is accomplished by actinic radiation curing.

Embodiment 39

A method of making an article, the method comprising:
providing a transfer polymer layer having a first major surface and a second major surface;
depositing a barrier layer material onto portions of the first major surface of the transfer polymer layer in a predetermined pattern;
partially embedding a plurality of microspheres into the portions of the first major surface of the transfer polymer layer not covered by the barrier layer material such that the plurality of microspheres at least partially protrude from the first major surface of the transfer polymer layer to form a predetermined patterned layer, wherein the predetermined pattern layer comprises at least one of (i) a plurality of the first areas, (ii) a plurality of the second areas, and (iii) combinations thereof;
contacting the embedded layer of microspheres with a bead bonding layer; and
removing the transfer polymer layer to form the article, wherein the article has a retroreflectivity ($R_a$) of less than 5.0 candelas/lux/square meter.

Embodiment 40

The method of embodiment 39, wherein the bead bonding layer is selected from at least one of (i) a resin comprising a fluorine-containing polymer, (ii) a linear resin, (iii) a resin having low crosslink densities, (iv) a resin having high crosslink densities, and (v) combinations and blends thereof.

Embodiment 41

The method of any one of embodiments 39-40, further comprising removing the barrier layer material after the transfer polymer layer is removed.

Embodiment 42

The method of any one of embodiments 39-40, wherein the barrier layer material is removed after partially embedding a plurality of microspheres into the first major surface of the transfer polymer layer not covered by the barrier layer material and prior to depositing the bead bonding layer.

Embodiment 43

The method of any one of embodiments 39-40, wherein the barrier layer material interfuses with the bead bonding layer.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; St. Lois, Mo., or known to those skilled in the art unless otherwise stated or apparent.

These abbreviations are used in the following examples: BCM/in$^2$=billion cubic microns per square inch, cc=cubic centimeter, cm=centimeter, ft=feet, g=gram, min=minute, m=meter, mm=millimeter, rpm=revolutions per minute, pbw=parts by weight, ppm=parts per million, s=seconds, psi=pressure per square inch.

Materials

| Designation | Description |
|---|---|
| PC | A clear 5 mil polycarbonate film having a glass transition temperature of 153° C, available under the trade designation "LEXAN 8010" from SABIC Innovative Plastics, Pittsfield, MA. Prior to use the polycarbonate was plasma treated generally as described in U.S. Pat. No. 8,634,146 at column 13, line 65 to column 14, line 30, with the following modifications. The width of the drum electrode was 108 cm (42.5 inches); the tetramethyl silane deposition step was not employed; during the treatment step 1000 standard cubic centimeters of nitrogen was used in place of oxygen, and the operating pressure was 90 milliTorr, and a plasma treatment time of 30 seconds. |
| PET 1 | A 50 micrometers thick, super clear polyester film, treated on both sides, available under the trade designation "MELLINEX XST 697" from DuPont Teijin Films, Chester, VA. |
| ICN 1 | A solvent free, polyfunctional, aliphatic isocyanate polymer based hexamethylene diisocyanate (HDI) having an equivalent weight of approximately 193, an NCO content of 21.8%, and a monomeric HDI content of 0.2% maximum, available under the trade designation DESMODUR N3300A from Bayer Materials Science LLC, Pittsburgh, PA. |

| Designation | Description |
|---|---|
| ICN 2 | A largely linear NCO prepolymer based on hexamethylene diisocyanate with a NCO content of 12-13% available under the trade designation DESMODUR XP 2617 from Bayer MaterialScience LLC, Pittsburgh, PA |
| fumed metal oxide | available under the trade designation "CAB-O-SPERSE 2012A" from Cabot Corp., Billerica, MA |
| Tinopal SFP | hexasodium-2,2'-[vinylenebis[3-sulfonato-4,1-phenylene)imino[6-(diethylamino)-1,3,5-triazine-4,2-diyl]imino]]bis(benzene-1,4-disulphonate) available under the trade designation "TINOPAL SFP" from BASF Corp., Florham Park, NJ |
| Borosilicate glass powder | Milled borosilicate glass powder having a size distribution of less than 200 mesh and density of 2.23 g/cc, and a refractive index of 1.476, available under the trade designation "PYREX 7740" from Strategic Materials Incorporated, Houston TX. |
| A1100 | Silquest A1100 silane coupling agent, gamma-Aminopropyltriethoxysilane, from Momentive Performance Materials, Inc., Waterford, NY. |
| FPOH 1 | A 65% solids solution in n-butyl acetate of a copolymer of tetrafluoroethylene and vinyl monomers, having a solids hydroxyl value of 63 mg KOH/gram resin which is suitable for reaction with isocyanates, available under the trade designation ZEFFLE GK 570 from Daikin America, Orangeburg, NY. This is believed to contain 35-40% fluorine by weight. |
| POH 1 | A liquid aliphatic polyester polyol, having a hydroxyl number of 230 and a hydroxyl equivalent weight of 244, available under the trade designation K-FLEX 188 from King Industries Specialty Chemicals, Norwalk, CT. |
| POH 2 | A liquid diol having a molecular weight of 90 and a boiling point of 23° C, available as 1,4-butanediol from Chemtura Corporation, Middlebury, CT. |
| T12 | Dibutyltin dilaurate (DBTDL), a liquid catalyst, available under the trade designation DABCO T-12 from Air Products and Chemicals, Incorporated, Allentown, PA. |

Test Methods

Method for Determining Pencil Hardness

Laminate microsphere films were evaluated for pencil hardness according to ASTM D 3363. Abrasive sandpaper (Grit No. 400) was adhered to a flat and smooth benchtop with double coated tape. Pencil leads (Turquoise Premium pencil leads (9H to 6B in hardness) from Prismacolor Professional Art Supplies, a subsidiary of Newell Rubbermaid Office Products, Oak Brook, Ill.) Totiens Drawing Leads with mechanical lead holder) were held at an angle of 90° to the abrasive paper and abraded until a flat, smooth, circular cross-section was achieved, free of chips or nicks on the edge of the lead. The force on the tip of the pencil was fixed at 7.5 N. The laminate bead film was placed on a glass surface. Using a freshly prepared pencil lead for each test, the lead was pressed firmly against the film at a 45° angle and at the desired load using an Elcometer 3086 Motorised Pencil Hardness Tester (obtained from Elcometer Incorporated, Rochester Hills, Mich.) and drawn across the test panel in the "forward" direction for a distance of at least 0.635 cm (0.25 inch). Three pencil tracks were made for each grade of lead hardness. Prior to inspection, crumbled lead was removed from the test area using a damp paper towel wetted with isopropyl alcohol. The film was inspected by eye for defects and under an optical microscope (50×-1000× magnification) for the first 0.317 cm to 0.635 cm (0.125 inch to 0.25 inch) of each pencil track. Moving from harder leads to softer, the process was repeated down the hardness scale until a pencil was found that did not scratch the film or rupture it, or dislodge or partially dislodge any beads. At least two of three tracks at each lead hardness were required to meet these criteria in order to pass. The hardest level of lead that passed was reported as the pencil hardness of the film. If the sample passed a pencil hardness and no additional pencils (i.e, no harder pencils) were used, the value was reported with a ">" in front of the pencil hardness. Values of 3H at a force of 7.5 Newtons, or harder, are desirable.

Pencil hardness testing was performed on the thermoformed articles on the side of the thermoformed shape near the bottom where the side of the shape meets the land, where the % Area Bead Coverage was reduced due to the strain of thermoforming. Samples were cut from side of the thermoformed shape, where the % Area Bead Coverage was reduced due to the strain of thermoforming. Pencil hardness was measured on the sample starting from a position 3 millimeters from the base of the up the side of the box in the direction towards the top of the box.

Mustard Test 1

Free standing decorative articles and laminates thereof were labeled and provided with a circle having diameter of 5.08 cm (2 inches) on their backside (i.e., opposite the exposed bead surface) using a permanent marking pen. A sheet of white bond paper was placed under the sample and a Hunter Labs MiniScan EZ spectrophotometer (Model #4500L, Hunter Associates Laboratory, Incorporated, Reston, Va.) was used to measure the L*, a*, and b* in the center of the circle from the frontside (i.e., surface having the exposed beads) of the film or laminate. Next, French's 100% Natural Classic Yellow Mustard was applied and uniformly distributed on the frontside of the film within the boundary of the circle using a cotton swab. Samples prepared in this manner were placed in a heat and humidity chamber at a temperature of 65° C. (150° F.) and a relative humidity of 80% for a time of 72 hours. Upon removal from the chamber, the films were rinsed with warm water and wiped with a paper towel to remove the remaining material from the test surface. Care was taken not to rupture the film during this process. After drying, L*, a*, and b* were measured as before and the change in the b* value was reported. The b* parameter was selected since it is a measure of the blue-yellow as defined in the CIE (International Commission on Illumination) 1976 Color Space. Values of 50 or less, or 30 or less, or even 20 or less are desirable.

Mustard Test 2

Mustard Test 2 was conducted similarly to Mustard Test 1 with the following exceptions: The heat and humidity chamber was held at a temperature of 60° C. (140° F.) and a relative humidity of 90% and the samples were only held for 24 hours instead of 72 hours.

Optical Measurements

Total transmittance, haze, and clarity measurements were made using a BYK Haze-Gard Plus, Model No. 4725 (BYK-Gardner USA, Columbia, Md.), following the manual procedures using an integrating sphere instrument having 0°/diffuse geometry and CIE standard illuminant C. Film orientation was such that incident light beam from the instrument interacted with the microsphere surface of the film first. Samples were placed directly at the haze port for measurement of transmittance and haze and at the clarity port for measurement of clarity.

Calculation of Area of Bead Coverage

Images were captured with bright field microscopy using a Keyence VHX-2000 series digital microscope (Keyence Corporation of America, Itasca, Ill.) in transmitted illumination mode at 200× magnification. Images were analyzed for areal bead coverage using the open source image processing software ImageJ (NIH, Bethesda, Md.—http://imagej.nih.gov/ij/). The software's automatic particle counting feature requires a binary image and provides information on the size of each particle and the overall area fraction in addition to a particle count. (A particle counting tutorial can be found here: http://imagej.nih.gov/ij/docs/pdfs/examples.pdf.) The following steps were used to determine area coverage: 1) begin with original microscope image, 2) threshold, 3) convert image to binary, 4) fill holes to turn each bead outline into a solid object, 5) watershed separation (separates overlapping objects in the binary image), 6) analyze particles to determine count and area coverage. The patterned beaded films were observed at 100× magnification initially to identify the repeat unit of each pattern, after which images were captured in transmitted illumination mode at 200× magnification and cropped to a whole repeat unit as determined by visual assessment.

Method for Coefficient of Friction Testing

Samples prepared according to the Examples and Comparative Example described below were evaluated for coefficient of friction using a table top peel tester (Model 3M90, available from Instrumentors Inc., Strongsville, Ohio). A 3.2 mm (0.013 inch) thick elastomeric foam having a density of about 0.25 g/cc (cubic centimeters) was bonded to a flat steel substrate measuring 63.5 mm (2.5 inches) square, having a thickness of about 6 mm (0.024 inches), and weighing approximately 200 grams including the foam. Next, a sample having a length of 63.5 mm (2.5 inches) that was approximately 5 mm longer than the steel substrate was place over the foam covered surface of the steel substrate such that the sample was wrapped around the leading edge of the steel substrate. A hole was cut in the sample to accommodate the pin by which the steel substrate was pulled during testing. This test article was placed with the sample side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds, wherein the surface comprising the plurality of microspheres (if present) contacted the glass surface. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate often readings/second and the average was recorded. Three trials were run for each sample and the average was reported for the coefficient of friction.

Method for RetroReflectivity Test

Measurements of the retro-reflection ($R_a$) were made directly on the surface comprising the plurality of microspheres of various constructions prepared according to the Examples and Comparative Example described below. The procedure as described in ASTM E810-03 (2013) "Standard Test Method for Coefficient of Retroreflection of Retroreflective Sheeting Utilizing the Coplanar Geometry" was followed. The samples were measured at an entrance angle of 5 degrees and an observation angle of 0.2 degree. $R_a$ was reported in Candelas/square meter/lux.

Method for Making Silane Treated Microspheres

Silane Treated Microspheres were made as follows: Borosilicate glass powder was passed through a flame treater twice by passing them through a hydrogen/oxygen flame at a rate of 3 grams/minute to form solid microspheres that were collected in a stainless steel container whereupon metallic impurities were removed using a magnet. The resulting microspheres were observed under a light microscope and seen to have less than 1% irregular shaped glass particles. The glass microspheres were then treated with 600 ppm of A1100 silane in the following manner. The silane was dissolved in water, and then added to the microspheres with mixing, air dried overnight, followed by drying at 110° C. (230° F.) for 20 minutes. The dried, silane treated microsphere beads were then sieved to remove any agglomerates and provide Silane Treated Microspheres having a size of 75 micrometers or less and were free flowing.

Method for Preparing Microsphere-Coated Articles

Preparation of Transfer Carrier 1

Transfer Carrier 1 comprises a transfer polymer layer and a patterned barrier layer made as follows: A web comprising a PET sheet coated with a heat-softenable layer of polyethylene was printed with a barrier material comprising s PVA-based aqueous ink having the following composition: 35.65 parts of fumed metal oxide; 16.04 parts poly(vinyl alcohol); and 0.21 parts Tinopal SFP; and 48.11 parts of deionized water. The barrier material was flexographically printed in a roll-to-roll fashion, using an EPDM dual-durometer printing sleeve (Interflex Laser Engravers, Spartansburg, S.C.) with laser-engraved patterns. Three different patterns were used.

Pattern 1 is shown in FIG. 2A, wherein the print (that becomes the first area substantially free of microspheres) regions are shown as white squares.

Pattern 2 is shown in FIG. 2B, wherein the print (that becomes the first area substantially free of microspheres) regions are shown as white squares.

Pattern 3 is shown in FIG. 2C, wherein the print (that becomes the first area substantially free of microspheres) regions are shown as white circles.

Pattern 4 is shown in FIG. 2F, wherein the print (that becomes the first area substantially free of microspheres) regions are shown as black circles.

Print conditions consisted of the following: the carrier web was printed using a 4.0 BCM/in$^2$ anilox roll at 50 ft/min (about 15 m/min), and subsequently dried with air impingement ovens until the printed barrier material was dry to the touch.

Preparation of Transfer Carrier 2

Transfer Carrier 2 comprises a transfer polymer layer and no barrier layer. Transfer Carrier 2 was made similarly to Transfer Carrier 1 except no barrier layer was used and thus, there was not printing or a subsequent drying step.

Preparation of Patterned Microsphere Monolayer Transfer Carrier

The transfer carrier from above (either Transfer Carrier 1 or 2) was preheated to about 140° C. (284° F.) and the Silane Treated Microspheres were cascade coated onto the transfer carrier using a mechanical sifter to form a transfer carrier having a monolayer of microspheres embedded in the polyethylene layer to a depth corresponding to about 30-40% of their diameter as determined by a magnifying imaging system.

Microsphere Carrier 1 was prepared as described in the Preparation of Patterned Microsphere Monolayer Transfer Carrier using Pattern 1.

Microsphere Carrier 2 was prepared as described in the Preparation of Patterned Microsphere Monolayer Transfer Carrier using Pattern 2.

Microsphere Carrier 3 was prepared as described in the Preparation of Patterned Microsphere Monolayer Transfer Carrier using Pattern 3.

Microsphere Carrier 4 was prepared as described in the Preparation of Patterned Microsphere Monolayer Transfer Carrier using Transfer Carrier 2 (i.e., no patterned barrier layer).

Microsphere Carrier 5 was prepared as described in the Preparation of Patterned Microsphere Monolayer Transfer Carrier using Pattern 4.

Example 1

Part A—A slightly hazy polyol solution was prepared by mixing FPOH1 (as received) with ethyl acetate, and then adding T12 to the FPOH1/ethyl acetate mixture. The resulting polyol solution contained 0.02% (by weight) T12 and was determined to be 55.93% solids. An isocyanate solution was prepared by mixing 50.83 wt % ICN1 and 49.17 wt % ethyl acetate. The polyol and isocyanate solutions were pumped through a static mixer such that 80.1 wt % of polyol solution were mixed with 19.9 wt % of isocyanate solution and the isocyanate/polyol mixture was knife coated on Microsphere carrier 1 and dried and cured in 4 thermal zones at 38° C., 71° C., 82° C., and 99° C. (100° F., 160° F., 180° F., and 210° F.) respectively over a total of 3½ minutes to provide a dried coating weight of 40.36 grams per square meter of the film transfer carrier. The approximate ratio of equivalents isocyanate to equivalents hydroxyl was 1.045.

Part B—A catalyzed polyol solution was prepared by mixing POH 1 (99.95 wt %) and T12 (0.05 wt %). A 100% solids two part urethane was prepared by combining 54.6 pbw POH 1/T12 mixture and 45.4 pbw ICN1 using a static mixer and then coated between the surface of the film transfer carrier of Part A and the surface of PET1 using a coating nip. The urethane was cured in four thermal zones all set at 77° C. (170° F.) over 6 minutes. The two part urethane coating weight was found to be 118.4 grams per square meter. The approximate ratio of equivalents isocyanate to equivalents hydroxyl was 1.05.

The transfer carrier, comprising the PET sheet and the polyethylene layer then was removed, resulting in a 0.25 millimeters (0.010 inches) thick, laminate article having microspheres partially embedded (approximately at 60-70% of their diameter) in a fluoro-urethane layer which is disposed directly onto a 100% solids-based, two part polyurethane, which is disposed directly onto PET1. Shown in FIGS. 6A and 6B are microscopic images of the resulting article. The darker circles shown in FIG. 6B are air bubbles located in the bead bonding layer, which are observed in the brightfield transmission microscopy image.

Based on calculations, the bead bond layer in Example 1 has a system functionality of 5.78, wherein the GPC measurement of the GK-570 is Mn=16,000

Example 2

Figure 7:
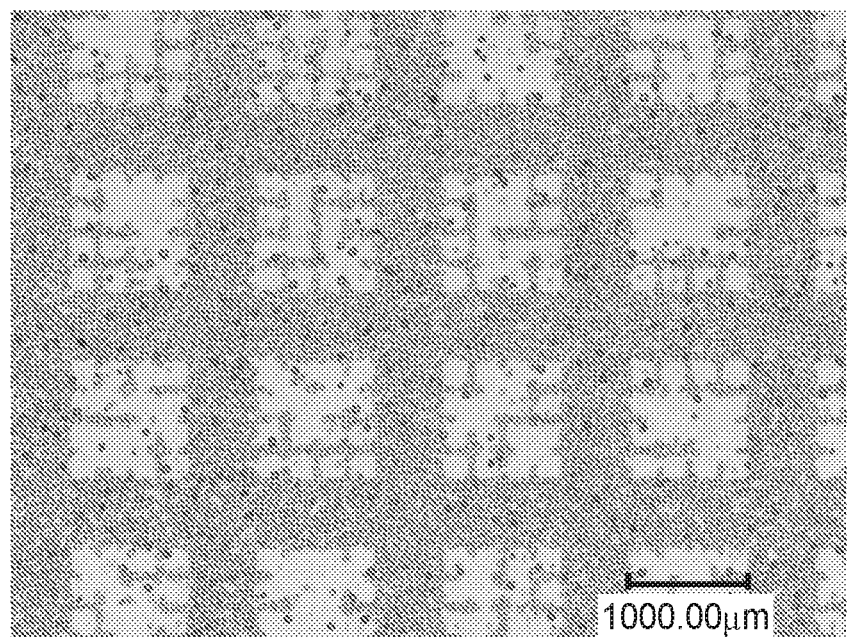
FIG. 7 is an optical micrograph of Example 2.

Example 2 was prepared as Example 1 except Microsphere Carrier 2 was used in place of Microsphere Carrier 1. Shown in FIG. 7 is a microscopic image of the resulting decorative article.

Example 3

Example 3 was prepared as Example 1 except Microsphere Carrier 3 was used in place of Microsphere Carrier 1. Shown in FIGS. 8A and 8B are microscopic images of the resulting decorative article. The darker circles shown in FIG. 8B are air bubbles located in the bead bonding layer, which are observed in the brightfield transmission microscopy image Comparative Example A Comparative Example A was prepared as Example 1 except Microsphere Carrier 4 was used in place of Microsphere Carrier 1.

Example 4

A 76.6% solids two-part polyurethane in MEK (methyl ethyl ketone) was prepared by adding the following materials to a MAX 40 Speedmixer cup (FlackTek Inc, Landrum, S.C.): 25.01 grams of ICN 2 and 8.66 g of MEK and the mixture was speed mixed at 2750 rpm for 45 seconds, at which time 3.27 g of POH 2 was added. The mixing cup was placed back in the speed mixer and the mixture was speed mixed at 2750 rpm for 45 seconds. The cup was removed from the speedmixer and 15.0 microliters T12 (DABCO T12) was added using a micropipette. The cup was again placed in the speedmixer and the mixture was mixed for an additional 45 seconds at 2750 rpm.

The resulting mixture was applied to the surface of Microsphere Carrier 1, using a notch bar coater having a gap setting of 0.1778 millimeters (0.007 inches) greater than the thickness of the Microsphere Carrier 1 at a rate of about 3.0 meters/minute (10 feet/minute). The coated precursor was dried and cured at room temperature for 3 minutes then dried and cured for 7 minutes in solvent oven at 80° C. (176° F.) to provide a laminate-able article having microspheres which were partially embedded in polyethylene on one side. While hot, the article was laminated to a nitrogen plasma-treated 5 mil polycarbonate film at 137.7° C. (280° F.), 1.5 feet/min and 80 psi with a ChemInstruments, Hot Roll Laminator, HL-101, (Fairfield, Ohio).

The transfer carrier, comprising the PET sheet and the polyethylene layer then was removed, resulting in a 0.23 millimeters (0.0089 inch) thick, laminate article having microspheres partially embedded in two part polyurethane, which is disposed directly onto a polycarbonate film.

Example 5

Example 5 was prepared as Example 4 except Microsphere Carrier 2 was used in place of Microsphere Carrier 1.

After the transfer carrier was removed, the laminate article was 0.25 millimeters (0.010 inches).

The above Examples and Comparative Example were tested as is with no effort to remove the barrier layer prior to testing. The Retroreflectivity ($R_a$), Area of Bead Coverage (% Area), Coefficient of Friction (COF), Optical Measurements (Transmission (% T), Haze (% H), and Clarity (% C)), Pencil Hardness (PH), and Mustard Tests 1 and 2 (delta b*) were tested. The results are shown in Table 1 below. NM=not measured.

TABLE 1

| Sample | % Area | COF | % T | % H | % C | PH | delta b* test 1 | delta b* test 2 | $R_a$ |
|---|---|---|---|---|---|---|---|---|---|
| Example 1 | 51.4 | 0.172 | 96.3 | 84.4 | 29.3 | >9 H | 33 | 13.5 | 0.25 |
| Example 2 | 52.2 | 0.188 | 96.5 | 79.9 | 51.1 | >9 H | 32.3 | 16.5 | 0.23 |
| Example 3 | 35 | 0.187 | 95.7 | 70.3 | 45.1 | >9 H | 36.8 | 24.5 | 0.33 |
| Comp. Ex A | 73.4 | NM | 94 | 95 | 9 | >9 H | NM | NM | 0.20 |
| Example 4 | 51.4 | 0.178 | 97.5 | 85 | 29 | >9 H | NM | NM | NM |
| Example 5 | 52.2 | NM | 97.2 | 82.9 | 36.3 | >9 H | NM | NM | NM |
| Example 6 | 42.0 | NM | NM | NM | NM | 2 H | NM | NM | NM |
| Example 7 | 60.0 | 0.131 | 97.9 | 91.5 | 14.7 | >9 H | NM | 32.6 | 0.18 |
| Example 8 | 60.0 | NM | 98.2 | 92.6 | 16.0 | >9 H | NM | NM | NM |
| Example 9 | 31.1 | NM | 95.7 | 77.0 | 21.3 | >9 H | NM | NM | NM |

Example 6

A decorative article made as described in Example 5, measuring 20.3 cm (8 inches) square, was thermoformed into a five-sided box. A COMET thermoformer (model C32.5S, MAAC Machinery Corporation, Carol Stream, Ill.) was used under the following conditions. TF temperature=340° F. (171° C.), Upper Radiant Oven Master Output=55%, Lower Radiant Oven Master Output=55%, Upper Radiant Oven Compensation=−35%, Lower Radiant Oven Compensation=−45%, Laminate Preheat Temperature=340° F. (171° C.), oven door positioning=up, Vacuum=15 psi, Oven Return Delay=1.5 s. A male test mold having a 6.35 cm (2.50 inches) square base, a height of 1.27 cm (0.5 inches), and various radii and draft angles to its vertical sides was used to form the films. See FIGS. 9A to 9E for the dimensions of the mold, with units in inches):

The sheet temperature just before molding was measured using a laser sight equipped, portable non-contact (infrared) thermometer, commercially available under the trade designation "SCOTCHTRAKINFRARED HEAT TRACER IR-16L3" from 3M Company, St. Paul, Minn. Samples were rated "Pass" if no cracks observed in the thermoformed article; and "Fail" if cracking was observed in the thermoformed article. The resulting thermoformed shape showed no cracking along the tops, corner, sides, or base of the shape and therefore passed.

Example 7

Figure 10:
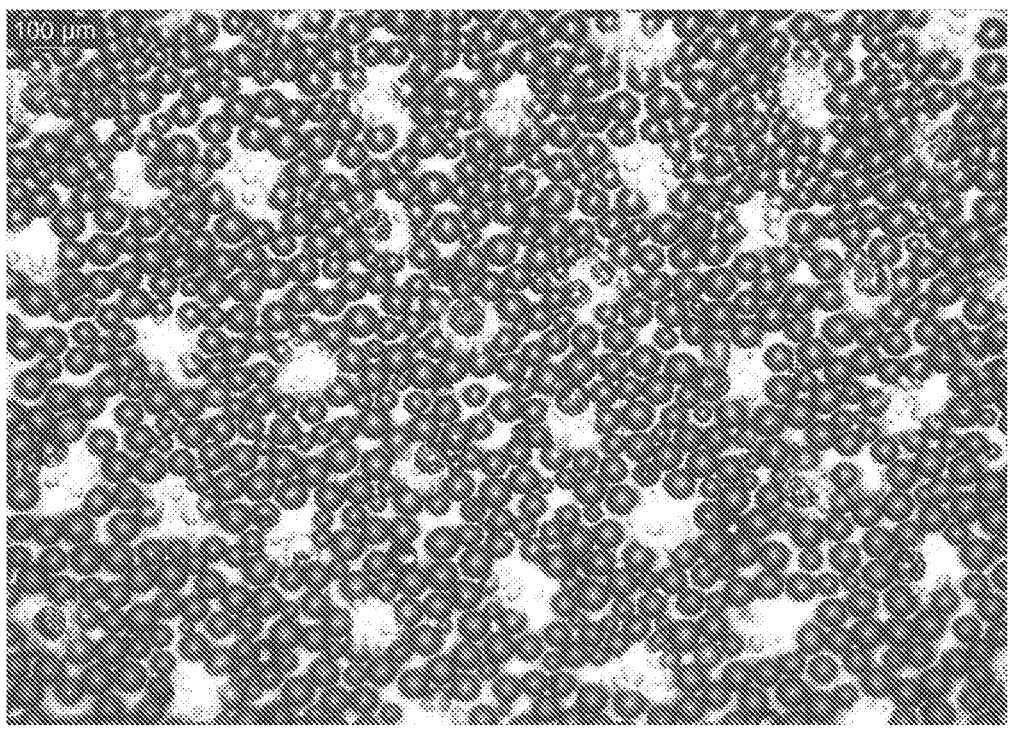
FIG. 10 is an optical micrograph of Example 7.

Example 7 was prepared as Example 1 except Microsphere Carrier 5 was used in place of Microsphere Carrier 1. After the transfer carrier was removed, the laminate article was 0.25 millimeters (0.010 inches). Shown in FIG. 10 is a microscopic image of the resulting decorative article. While visible under the microscope, the pattern is not visible to the naked eye.

Example 8

Example 8 was prepared as Example 5 except Microsphere Carrier 5 was used in place of Microsphere Carrier 1. After the transfer carrier was removed, the laminate article was 0.25 millimeters (0.010 inches).

Example 9

A decorative article was prepared as in Example 8 and was thermoformed into the 5 sided box as described in Example 6 with the following modifications. The thermoforming temperature (TF) of the film was =341° F. (172° C.). The sample was rated a pass after thermoforming.

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. An article comprising:
   (a) a microsphere layer comprising a monolayer of microspheres, wherein the monolayer of microspheres comprises a predetermined pattern, the predetermined pattern comprises at least one first area substantially free of microspheres and at least one second area comprising a plurality of randomly positioned microspheres wherein at least one of:
      (i) the at least one first area comprises a third area and a fourth area substantially free of microspheres;
      (ii) the at least one second area comprises a fifth area and a sixth area comprising a plurality of randomly positioned microspheres; or
      (iii) both (i) and (ii); and
   (b) a bead bonding layer disposed on the microsphere layer, wherein the plurality of microspheres are partially embedded in a first major surface of the bead bonding layer,
   wherein the article has a retroreflectivity ($R_a$) of less than 5.0 candelas/lux/square meter when measured following ASTM E810-03 (2013) with a 0.2 degree observation angle and a 5 degree entrance angle.

2. The article of claim 1, wherein the bead bonding layer comprises at least one of (i) a resin comprising a fluorine-containing polymer, (ii) a linear resin, (iii) a resin having low crosslink densities, (iv) a resin having high crosslink densities, and (v) combinations and blends thereof.

3. The article of claim 2, wherein the resin having low cross link densities are those resins comprising lightly crosslinked material having a molecular weight per crosslink point of greater than about 2,800 g/mol.

4. The article of claim 2, wherein the fluorine-containing polymer is selected from at least one of the following: fluoroolefins, fluorourethanes, and combinations thereof.

5. The article of claim 1, wherein the density of microspheres in the at least one first area is less than 20% of the density of microspheres in the at least one second area.

6. The article of claim 1, wherein a refractive index of the microspheres is less than 1.6.

7. The article of claim 1, wherein the microspheres covers more than 20% and less than 60% of the surface of the bead bonding layer.

8. The article of claim 1, wherein the microspheres have an average diameter of 20 to 200 micrometers.

9. The article of claim 1, wherein the article further comprises a reinforcing layer formed on a second major surface of the bead bonding layer opposite the microsphere layer wherein the reinforcing layer is selected from one of the following: polyurethane resins, acrylic resins, polyester resins, epoxy resins, and mixtures thereof.

10. The article of claim 1, wherein the microspheres within the at least one second area are closely packed.

11. The article of claim 1, wherein the at least one second area comprises at least three microspheres.

12. The article of claim 1, wherein the article has a pencil hardness of at least 9H at 7.5 Newtons and wherein the microspheres covers more than 20% and less than 60% of the surface of the bead bonding layer.

13. The article of claim 1, wherein the article is transparent.

14. The article of claim 1, wherein the article is thermoformable.

15. A thermoset article derived from the thermoformable article of claim 14.

16. The thermoset article of claim 15, wherein the thermoset article is a 3-dimensional shaped article.

17. The article of claim 1, wherein the at least one first area is continuous across the article and at least one second area is discontinuous.

18. The article of claim 1, wherein the at least one second area is continuous across the article and the at least one first area is discontinuous.

\* \* \* \* \*